(12) United States Patent
Hoffmüller et al.

(10) Patent No.: US 11,535,751 B2
(45) Date of Patent: Dec. 27, 2022

(54) ASYMMETRICALLY SUBSTITUTED POLYORGANOSILOXANE DERIVATIVES

(71) Applicant: Momentive Performance Materials GmbH, Leverkusen (DE)

(72) Inventors: Gunnar Hoffmüller, Odenthal (DE); Thorsten Felder, Dusseldorf (DE); Roland Wagner, Bonn (DE); Philip Kensbock, Cologne (DE); Anita Witossek, Langenfeld (DE); Silvia Effert, Leverkusen (DE); Joerg-Walter Hermann, Leichlingen (DE); Siegfried Hossinger, Bergisch Gladbach (DE); Andreas Haeuseler, Cologne (DE)

(73) Assignee: Momentive Performance Materials GmbH

( * ) Notice: Subject to any disclaimer, the term of this patent is extended or adjusted under 35 U.S.C. 154(b) by 0 days.

(21) Appl. No.: 15/745,499

(22) PCT Filed: Jul. 20, 2016

(86) PCT No.: PCT/EP2016/001266
§ 371 (c)(1),
(2) Date: Jan. 17, 2018

(87) PCT Pub. No.: WO2017/012714
PCT Pub. Date: Jan. 26, 2017

(65) Prior Publication Data
US 2018/0371248 A1    Dec. 27, 2018

Related U.S. Application Data

(60) Provisional application No. 62/194,563, filed on Jul. 20, 2015.

(51) Int. Cl.
*C08G 77/04* (2006.01)
*C08L 83/08* (2006.01)
(Continued)

(52) U.S. Cl.
CPC ............ *C08L 83/08* (2013.01); *C08G 77/045* (2013.01); *C09D 5/1675* (2013.01); *G02B 1/14* (2015.01)

(58) Field of Classification Search
None
See application file for complete search history.

(56) References Cited

U.S. PATENT DOCUMENTS

| 2,889,349 A | 6/1959 | Garden | |
|---|---|---|---|
| 2002/0010245 A1* | 1/2002 | Enami | C08K 9/06 524/430 |

(Continued)

FOREIGN PATENT DOCUMENTS

| EP | 1597969 A1 | 11/2005 |
|---|---|---|
| JP | H03-161491 | 7/1991 |

(Continued)

OTHER PUBLICATIONS

Crivello et al. "Regioselective Hydrosilylations. IV. The Synthesis and Polymerization of Monomers Containing Epoxy and Alkoxy Groups", Journal of Polymer Science: Part A: Polymer Chemistry, 1993, 31, 3121-3232. (Year: 1993).*

(Continued)

*Primary Examiner* — Robert S Loewe
(74) *Attorney, Agent, or Firm* — James C. Abruzzo; McDonald Hopkins LLC

(57) ABSTRACT

An asymmetrically substituted polyorganosiloxane comprising at least one or more siloxane blocks and different reactive groups at each end of the siloxane chain, e.g. an alkoxysilyl, alkenyl, epoxy, hydroxyaromatic or an ionic substituent. Each polyorganosiloxane block has substantially a monomodal chain length distribution and is suitable for the use as a surface modifying agent for organic or inorganic particles, as a surface active material, and/or as a (Continued)

Evaluation of the antifouling/fouling release performance
Fouling rating (FR): FR 100 = covered surface with marine biofouling; FR 0 = surface free of fouling).

compatibilizer in compositions having more two or more non-miscible phases.

31 Claims, 4 Drawing Sheets

(51) Int. Cl.
*C09D 5/16* (2006.01)
*G02B 1/14* (2015.01)

(56) References Cited

U.S. PATENT DOCUMENTS

| 2003/0120016 | A1 | 6/2003 | Okawa et al. | |
|---|---|---|---|---|
| 2004/0197284 | A1 | 10/2004 | Auguste | |
| 2006/0229423 | A1* | 10/2006 | Parakka | C07F 7/0874 |
| | | | | 528/37 |
| 2007/0112112 | A1 | 5/2007 | Kerschner | |
| 2007/0290202 | A1* | 12/2007 | Matsumoto | C07F 7/1804 |
| | | | | 257/40 |
| 2007/0293624 | A1* | 12/2007 | Matsumoto | C08L 83/04 |
| | | | | 524/588 |
| 2008/0057325 | A1* | 3/2008 | Sakurai | C09J 183/04 |
| | | | | 428/447 |
| 2010/0276638 | A1 | 2/2010 | Dai et al. | |
| 2010/0216911 | A1 | 8/2010 | Doshi et al. | |
| 2011/0160389 | A1* | 6/2011 | Bubat | C09C 1/62 |
| | | | | 524/588 |
| 2016/0039848 | A1 | 8/2016 | Hattori | |

FOREIGN PATENT DOCUMENTS

| JP | 1990306980 | | 2/1997 |
|---|---|---|---|
| JP | 2001-348429 | | 12/2001 |
| JP | 2001-348430 | | 12/2001 |
| JP | 2002-303956 | | 10/2002 |
| JP | 1999158188 | | 6/2009 |
| JP | 2010538107 | | 12/2010 |
| JP | 2011-144272 | | 7/2011 |
| JP | 2012-525467 | | 10/2012 |
| WO | 2013172177 | A1 | 11/2013 |
| WO | 2014126599 | A1 | 8/2014 |

OTHER PUBLICATIONS

Katsumata et al. "Synthesis and properties of polynorbornenes bearing oligomeric siloxane pendant groups" Polymer 2009, 50, 1389-1394. (Year: 2009).*

Yoshino et al. "A convenient synthesis of α, ω-difunctionalized linear dimethylsiloxanes with definite chain lengths." Chemistry letters 19, No. 11 (1990): 2133-2136. (Year: 1990).*

International Search Report and Written Opinion dated Dec. 20, 2016; International Patent Application No. PCT/EP2016/001266 filed Jul. 20, 2016; ISA/EP.

Huber et al., "Silicone Fluids: Synthesis, Properties and Applications." Lubr. Sci. 1986, 3, 2, 105-120.

Gustoff, "Silicone Fluid ,Manufacture." Ind. Eng. Chem. 1957, 49, 11, 1807-1811.

* cited by examiner

Evaluation of the antifouling/fouling release performance

Fouling rating (FR): FR 100 = covered surface with marine biofouling; FR 0 = surface free of fouling).

After 85 days of sea immersion

Panel A

Panel B

Panel C

Panel D

Panel E

Panel F

After 189 days of sea immersion

Panel A

Panel B

Panel C

Panel D

Panel E

Panel F

After 219 days of sea immersion

Panel A

Panel B

Panel C

Panel D

Panel E

Panel F

ASYMMETRICALLY SUBSTITUTED POLYORGANOSILOXANE DERIVATIVES

CROSS-REFERENCE TO RELATED APPLICATIONS

The present application claims priority to International Patent Application No. PCT/EP2015/001266 entitled "Asymmetrically Substituted Polyorganosiloxane Derivatives," filed on Jul. 20, 2016, which claims priority to and the benefit of U.S. Provisional Application No. 62/194,563, entitled "Asymmetrically Substituted Polyorganosiloxane Derivatives," filed on Jul. 20, 2015, the disclosure of which is incorporated herein by reference in its entirety.

FIELD

The present invention relates to siloxane materials, and particularly to siloxane materials that are suitable as dispersion aids, surfactants, or compatibilizers in various systems. The present invention relates to asymmetrically substituted di- and pentasiloxane derivatives and oligomers thereof suitable for coating of organic and inorganic surfaces, organic and inorganic particles, and/or which can enhance compatibilization of materials or separated liquid phases, e.g., solutions or polymer systems that are mixed together and tend to separate into phases. The work leading to this invention has received funding from the European Union Seventh Framework Program (FP7-NMP-2010-LARGE-4) under "grant agreement" no 263382. The antifouling project received funding from the Federal Ministry for Economic Affairs and Energy of Germany under"grant agreement" 03SX370H.

BACKGROUND

Dispersion aids based on poly- or oligosiloxane are well known in the prior art. For example polydiorganosiloxandiols are useful for the dispersion of silicas and inorganic oxides. Filler materials such as, e.g., silicas, metal oxides of aluminum, titanium, zinc, zirconium or tin, and other metal oxides, are employed in various compositions. Such fillers are applied for several reasons in coating or rubber compositions. For example, fillers can be added to improve the physical properties, e.g., to provide mechanical strength or even to enhance the optical properties of those compositions. In order to improve the quality of the dispersion of fillers, to better adjust optical properties between a matrix polymer or the chemical bonding between a filler, and a matrix polymer it is desired to provide siloxanes having two different terminal groups. Without being bound to any particular theory, one group may have a preferred ability to interact with the filler or any first substrate and a second group may be accessible for a reaction with matrix polymer of the composition or may provide groups which can shielding those filler particles or substrates. Many attempts have been made to achieve such asymmetric polyorganosiloxanes having two different end groups. Either the syntheses are (i) restricted to specific end groups or (ii) do not exclude equilibrating reactions, i.e., the reaction results in other by-products having two identical terminal groups or comprise cyclic siloxanes having none of the desired functionality.

Therefor there is still a need for asymmetric polysiloxanes which have less of the disadvantages of previous siloxanes and can provide beneficial effects in the use as surface modifying agent and/or dispersion aid or compatibilizer.

SUMMARY

The inventors have surprisingly found a synthesis route which provides polyorganosiloxanes having two different terminal groups and a well-defined siloxane chain length. The polyorganosiloxanes materials are relatively short-chained siloxanes which can be used in a variety of applications including surface modifying agents, dispersion aids, or compatibilizer etc.

In one aspect, the present invention provides asymmetrically substituted, short chained siloxane derivatives having monomodal distribution of the chain length, i.e. a small polydispersity index. The various reactive terminal groups are selected from alkoxysilyl, unsaturated, epoxy, ionic and di- or trihydroxyaromatic substituents as a terminal group. The insertion of two different reactive groups according to the invention results in an asymmetric polyorganosiloxane having two different reactive moieties at the end of the chain. In one embodiment, the reactive moiety is chosen from an epoxy, an olefinic moiety, an acetylenic moiety, etc., or a combination of two or more thereof, whereby the group at other terminal position may have the ability to undergo a condensation or a substitution reaction. Another aspect of the invention is that it provides an asymmetrically substituted polyorganosiloxane that comprises a relatively narrow molecular weight distribution of the polyorganosiloxane. In one embodiment, the siloxane compound has a substantial monomodal distribution of the chain length, i. e., comprising more than 85 wt. % having the same chain length.

DETAILED DESCRIPTION

Figure 1:
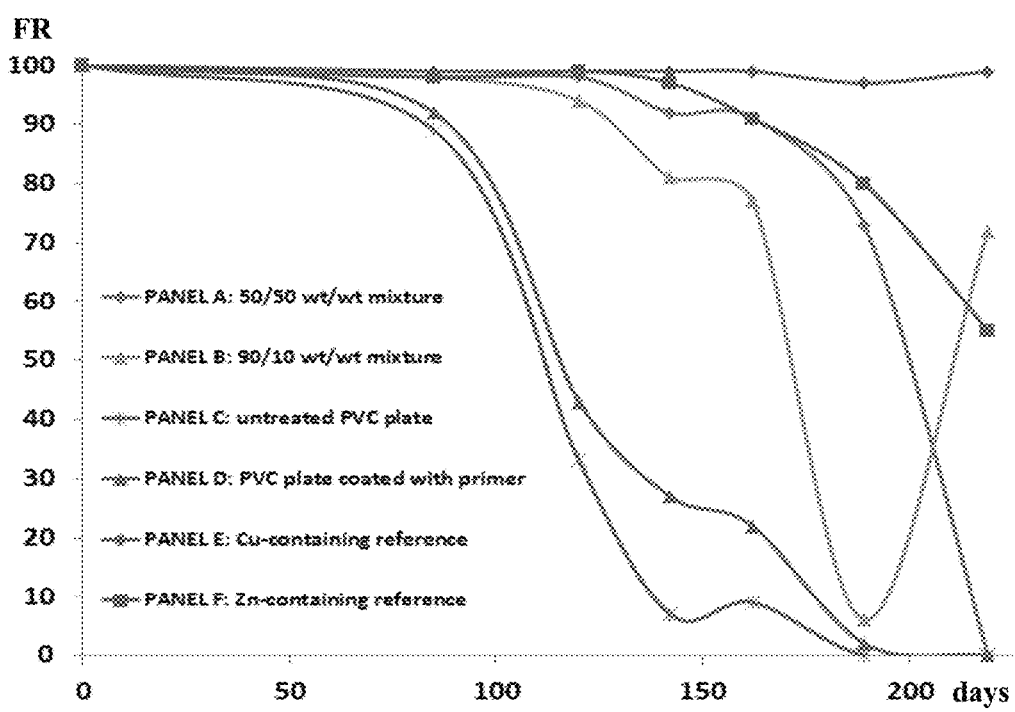
FIG. 1 is a graph showing the antifouling/fouling release performance of antifouling coating compositions comprising asymmetrically substituted polyorganosiloxane derivatives in accordance with aspects of the invention.
Figure 2:
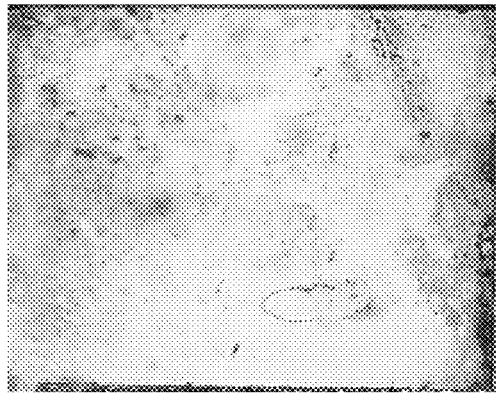
FIGS. 2-4 are images showing the fouling coverage of panels A to F coated with different materials after 85 days of sea immersion, 189 days of sea immersion, and 219 days of sea immersion respectively.
Figure 2:
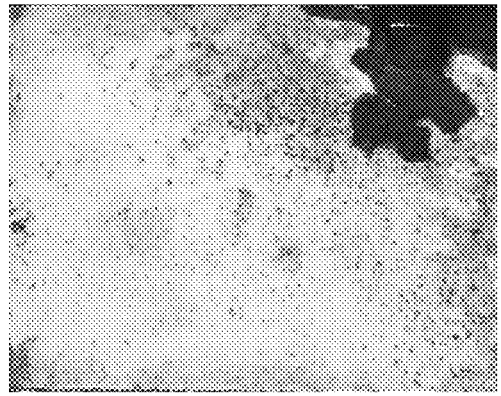
Figure 2:
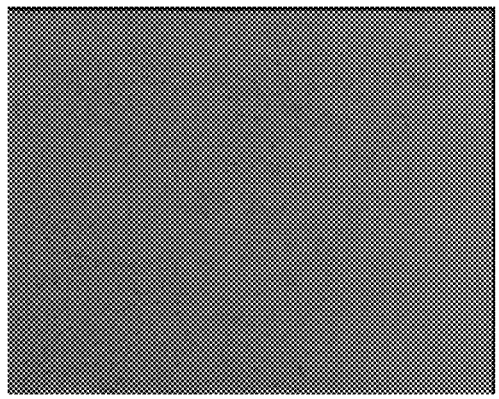
Figure 2:
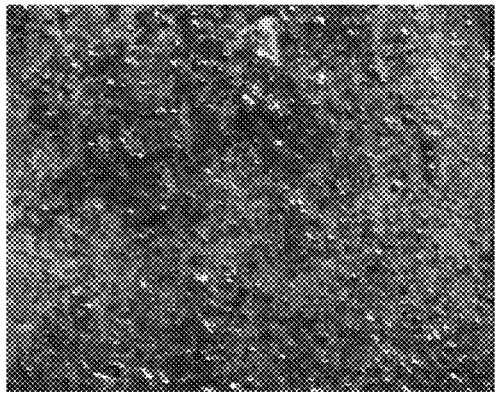
Figure 2:
Figure 2:
Figure 3:
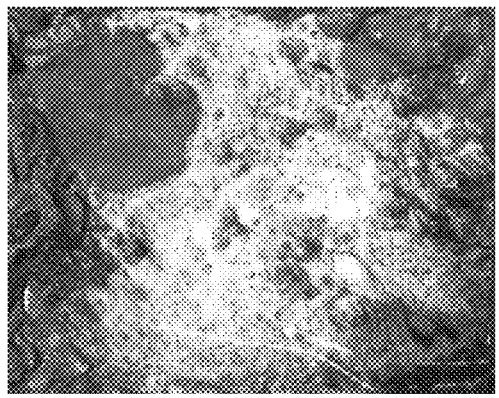
Figure 3:
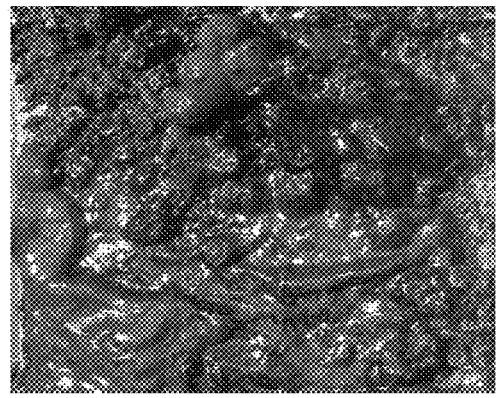
Figure 3:
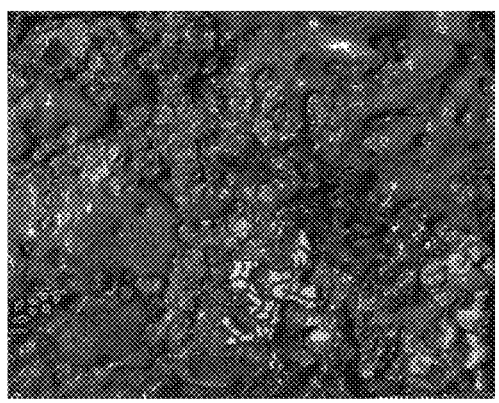
Figure 3:
Figure 3:
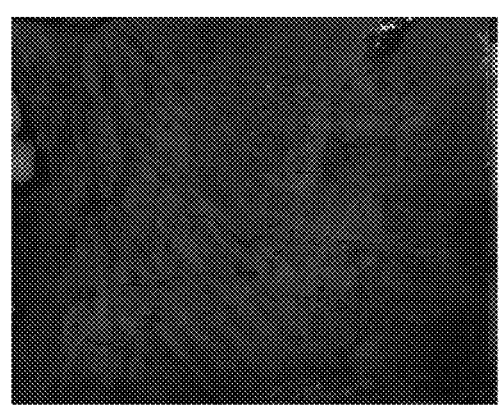
Figure 3:
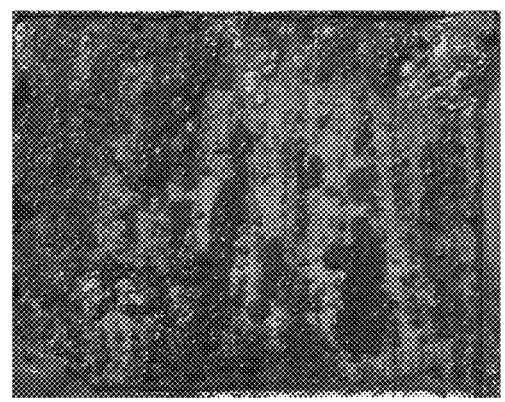
Figure 4:
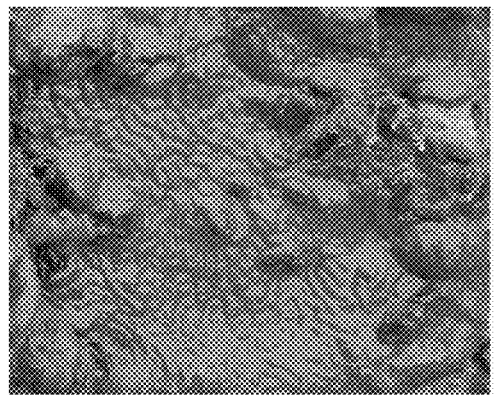
Figure 4:
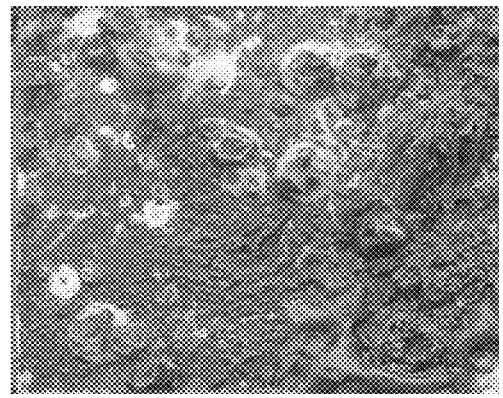
Figure 4:
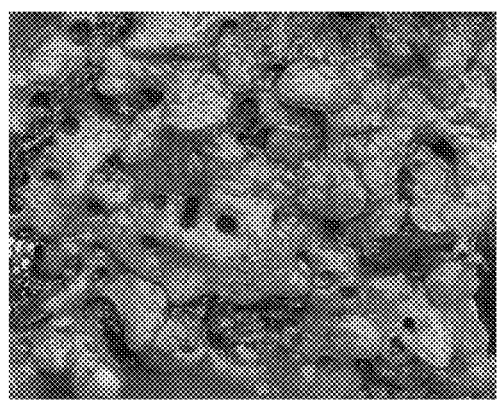
Figure 4:
Figure 4:
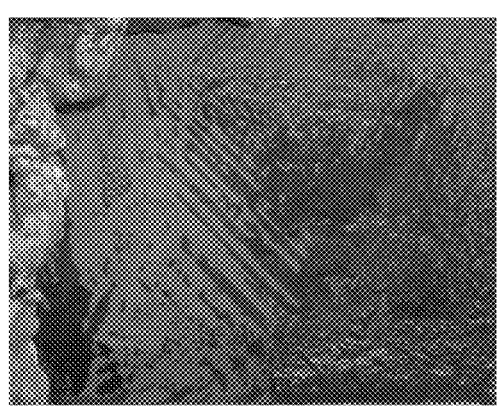
Figure 4:
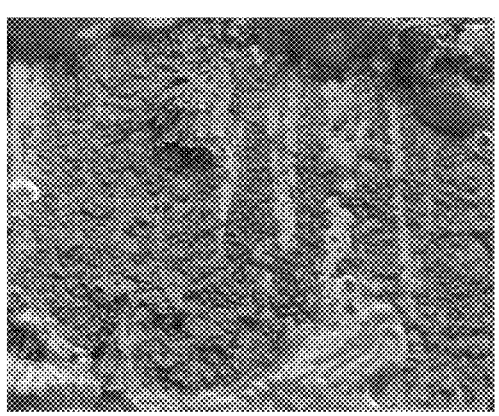

Provided are polyorganosiloxanes comprising two different terminal groups where the polyorganosiloxane exhibits a low polydispersity index. The polyorganosiloxanes may find use in a variety of applications and materials.

Based on the use of specific uniform siloxane precursors the inventors could synthesize polyorganosiloxanes having exactly two different reactive groups at both ends at a level of high purity respectively a small polydispersity index, which is characterized by the ratio of the weight-average molecular weight to the number-average molecular weight Mw/Mn. Here it is in the range from 1 to 1.2. The inventors found a way to insert terminal groups stepwise, whereby after each reaction step a purification step could be applied, which allows to control the completeness of the addition of a first terminal end group and then the addition of a second different terminal group. It is part of the inventive concept to apply the stepwise addition of reactive terminal groups on monomodal polyorganosiloxane precursors which are generated in a non-equilibrium siloxane synthesis.

In one aspect, provided is a polyorganosiloxane of the formula (I) comprising two different terminal groups $Z^1$ and $Z^2$:

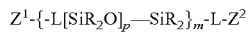  (I)

where
p=1 to 9,
m=1 to 5
wherein R=R$^1$
R or R$^1$ is a saturated hydrocarbon substituent selected from the group consisting of a monovalent C1 to C22-alkyl, optionally substituted by F, a C6-C22-aryl, a C8-C22-polycyclic aryl, a C7-C23-alkylaryl, and a C7-C22-arylalkyl group,
L is a single bond, or a divalent or trivalent group L$^1$ or L$^2$ which are selected from the group consisting of a divalent C1-C12-alkylene group, which can be interrupted by one or more —O—, — or —NR$^3$—C(O)—, and/or —NR$^3$—, urethane-OC(O)NR$^3$—, urea —N—R$^3$HC(O)N—R$^3$— moieties, and substituted by one or more OH groups, wherein R$^3$ is hydrogen, Me$_3$Si— or C1-C8 alkyl,
bonded via carbon bond to the silicon atom of the siloxy unit
Z is a monovalent group selected from the group $Z^1$ and $Z^2$, wherein
Z$^1$ and Z$^2$ are selected from Z which is selected from the group consisting of R$^1$, R$^2$, hydrogen, monovalent unsubstituted or substituted C1-C30 hydrocarbons, and an ionic group comprising O, N, S and P atoms, in more specific embodiments, Z is selected in from the group consisting of C8-C22-alkylarylalkyl, C6-C22-aryl ether, C6-C22-cycloalkyl, C7-C22-cycloalkylalkylene, C7-C22-bicycloalkyl, C6-C12-cyclothioalkyl, C5-C12-hetero-N, —O—, —S-aryl, C1-C20-alkyl aldehydes and C7-C20-alkylaryl aldehydes, optionally substituted by C1-C8-alkyl, OH, Cl, Br, CN and a silyl ether group R$^1_3$Si—O—, and selected from
a poly-C2-C4-alkylene oxide, OH or OR$^3$ or OC(O)R$^3$ terminated, and wherein R$^2$ is selected from a monovalent unsaturated, unsubstituted or substituted alkenyl or alkynyl group selected from the group consisting of a C2-C22-alkenyl, C6-C22-cycloalkenyl, C7-C22-bicycloalkenylalkylene, C2-C22-alkynyl, and the related oxiranyl and carbonate derivatives of R$^2$, selected from group of C3-C22-oxiranyl groups and C4-C23-carbonate compounds,
and a group selected from Cl, Br, I, —SH, —S—R$^1$, —OH, —O—R$^1$, —CN, —NCO, blocked NCO, and a group selected from
(R$^1$X)$_x$R$^1_{3-x}$Si—, R$^6_x$R$^1_{3-x}$Si—, wherein x=1-3, wherein X is =OH, OR$^1$, —NR$^1_2$, R$^1$—C(O)—O—, wherein R$^6$=C6-C10-aryl, C7-C12-arylalkyl, C6-C12-cycloalkyl, C7-C16-bicycloalkyl, C3-C12-epoxy alkyl, C6-C12-epoxy cycloalkyl, C7-C16-epoxy bicycloalkyl, C6-C12-thiocycloalkyl, C5-C12-hetreo-N, —O—, —S-aryl, and
selected from an ionic group derived from an ester of a carboxylic acid, S or P acid, such as —C(O)—O—R$^3$, (R$^3$O)$_2$—P(O)—O—, (R$^3$O)$_2$—P(O)—, phosphonates (R$^3$—O)$_2$—P—, phosphines, amines, betaines, such as —NHR$^3$—CH$_2$—COOH, —NHR$^3$—CH$_2$—O—S(O)$_2$(OH), —S—S(O)$_2$(OR$^3$), and a primary, secondary, tertiary amine —NR$^3_2$ or phosphine —PR$^3_2$, and an acid addition salt of an amine, phosphine preferably salts having quaternary —N$^+$R$^1_3$ or —P$^+$R$^1_3$ groups, and alkyl or aryl enamine of the formula

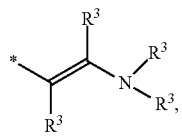

wherein R$^3$ is hydrogen, C1-C8 alkyl, C2-C8 alkenyl, R$^1_3$Si—,
bonded via a single bond or carbon bond of L to the silicon atom of the siloxy unit of the polyorganosiloxane (I), whereby
L-Z$^2$ and -L-Z$^1$ are different.

In a preferred embodiment the inventive compounds are composed of one or more defined polysiloxane blocks consisting essentially either of a disiloxane, a polyorganopentasiloxane, or polyorganodecasiloxane block. The term consisting essentially of means that more than 80 wt. % of the compound of the formula (I) has the same chain length, wherein the index p in formula (I) is p=1, 4, or 9. In a preferred embodiment more than 85 wt. % and in a particularly preferred embodiment more than 90 wt. % are showing an index of p either 1 or 4 or 9.

This high degree of a uniform molecule having a polydispersity index close to 1 could be achieved by the purification process for the precursors according to the invention. It is therefore stated to have polyorganosiloxanes with a monomodal chain length distribution.

This feature could be achieved since the precursors, i.e., compounds like disubstituted tetraorganodisiloxanes, hexaorganocyclotrisiloxanes and their reaction product of the non-equilibrated reaction, have distinct boiling points and can be enriched respectively purified, e.g., by distillation or crystallization in each of the following steps of the addition of the terminal groups.

For example one of the preferred pentasiloxane can be Hme$_2$Si—O-[me$_2$SiO]$_3$-Sime$_2$H synthesized by a non-equilibrating reaction of hexamethylcyclotrisiloxane and Hme$_2$Si—O-Sime$_2$H (according to e.g. JP 11158188 B) already in high purity. After an additional distillation a pentasiloxane content of more than 90 wt. % according to gas chromatography is achievable.

The aforementioned process for the synthesis of the non-equilibrated polyorganosiloxanes is applicable also for other di-substituted tetraorganodisiloxanes, and hexaorganocyclotrisiloxanes.

The purified pentasiloxane either having the structure M$^H$D$_3$M$^H$ or M$^{vi}$D$_3$M$^{vi}$ is submitted to the stepwise addition of further compounds comprising complementary reactive groups which can undergo a hydrosilylation reaction with the SiH unit respectively together with unsaturated groups. The precursors for organic groups forming the L and Z groups must therefore provide such functionalities for a first hydrosilylation step. The precursors comprise further functionalities which after hydrosilylation step can form the group Z or provide a second functionality which can serve as basis in a further third reaction to form Z$^1$, Z$^2$ or Z$^{22}$. For example alkylhalogenides may serve to form —C—N—, —C—S—, —C—NCO, —C—P— bonds or epoxides which are a basis to form esters, amine etc.

The inventors have found a syntheses route or method to create asymmetrically substituted polyorganopentasiloxanes whose starting precursors are either di-, penta- or decasiloxane such as M$^H$M$^H$, M$^H$D$_3$M$^H$, M$^H$D$_8$M$^H$, or respectively the $M^{R2}M^{R2}$ or $M^{R2}D_3M^{R2}$ polyorganosiloxanes, wherein $R^2$ is an unsaturated group, and wherein any of these precursors can be reacted in the additional steps of, e.g., i) with unsaturated compound e.g. vinylalkoxysilane or alkenylhalogenid or a hydridoalkoxysilane or SiH-siloxane to create a new terminal group, then optionally get purified or enriched and in a second step;

ii) reacted with a further other unsaturated compound, a hydridoalkoxysilane, or a SiH-siloxane to form a second terminal reactive group different the group in step i) whereby, e.g., the second precursor is an unsaturated epoxy, alkenylhalogenid, or alkenyl ether compound in the presence of a hydrosilylation catalyst.

The polyorganosiloxane compounds according to the invention can be derived from any suitable polyorganosiloxane as a starting material which provides symmetrically reactive substituents at the terminal groups. Particularly suitable polyorganosiloxanes include, but are not limited to:

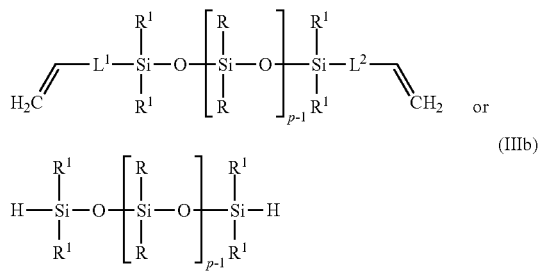

(IIIa)

(IIIb)

In a preferred embodiment the substituents of the polyorganosiloxane are defined as follows:

R and $R^1$ are methyl, 3,3,3-trifluoropropyl, phenyl, styryl, phenylpropyl, naphthyl, $L^1$ and $L^2$ are selected from a single bond, a divalent or a trivalent C1-C12-alkylene groups, which can be interrupted by one or more —O—, — or —$NR^3$—C(O)—, and/or —$NR^3$— moieties, and substituted by one or more OH groups, $Z^1$ and $Z^2$ are selected from Z wherein Z is selected from the group which consists of vinyl, allyl, hexenyl, octenyl, allyloxypropyl, —$CH_2C\equiv CH$, —C(O)C$\equiv$CH, —C(O)(CH$_2$)$_8$CH=CH$_2$, cyclohexenylethyl, limonyl, norbornenylethyl, vinylphenylethyl, allyloxyphenyloxypropyl, —(OCH$_2$CH$_2$O)$_a$—(OCH$_2$CH(CH$_3$))$_b$—(OCH$_2$CH(CH$_3$))$_c$—OCH=CH$_2$, or —(OCH$_2$CH$_2$)$_a$—(OCH$_2$CH(CH$_3$))$_b$—(OCH$_2$CH$_2$CH(CH$_3$))$_c$—OH, —(OCH$_2$CH$_2$)$_a$—(OCH$_2$CH(CH$_3$))$_b$—(OCH$_2$CH(CH$_3$))$_c$—O—C1-C4 alkyl, or —(OCH$_2$CH$_2$)$_a$—(OCH$_2$CH(CH$_3$))$_b$—(OCH$_2$CH$_2$CH(CH$_3$))$_c$—O—C(O)—C1-C4 alkyl, with a, b, c being 0 to 20, in one embodiment, 0 and 1 to 20, and a+b+c=1 to 20,

[—Si(CH$_3$)$_2$OSi(CH$_3$)$_2$]CH=CH$_2$, and

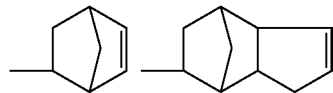

and $(R^1X)_xR^1_{3-x}Si$—, wherein x=1-3, wherein X is =OH, $OR^1$, —$NR^1_2$, $R^1$—C(O)—O—, and of unsubstituted or substituted oxyphenyl moieties of the formula

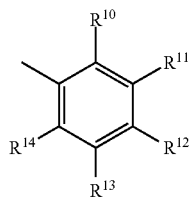

wherein $R^{10}$, $R^{14}$ is hydrogen or $R^1$ and $R^{11}$, $R^{12}$, $R^{13}$ are selected from —$OR^3$, whereby at least one of the groups $R^{11}$ to $R^{13}$ is OH, and selected from eugenol, bisphenolethers, cumylphenolether, glycidylpropylether, epoxylimonyl, epoxycyclohexanethyl, epoxynorbornyl,

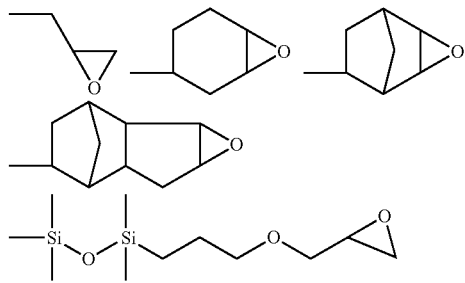

and the carbonate derivatives of these epoxides, 1,3-dithiolane, 1,3,5-trithiane, 1,3-dithiane, thiophenyl, tetrahydro-2H-thiopyranyl, carbazol, indol, trisphenylsilyl, and $R^6Me_2Si$—, wherein $R^6$=C6-C10-aryl, C7-C12-arylalkyl, C6-C12-cycloalkyl, C7-C16-bicycloalkyl, C6-C12-cyclothioalkyl, C5-C12-hetero-N, —O, —S-aryl, optionally substituted by C1-C8-alkyl, OH, Cl, CN, and a silyl ether group $R^1_3Si$—O—, and a group selected from Cl, —S—H, —NCO, blocked NCO, and selected from an ionic group derived from an ester of a carboxylic acid, S or P acid such as —C(O)—O—$R^3$, $(R^3O)_2$—P(O)—O—, $(R^3O)_2$—P(O)—, phosphonates $(R^3$—O)$_2$—P—, phosphines, amines, betaines such as —$NHR^3$—$CH_2$—COOH, —$NHR^3$—$CH_2$—O—S(O)$_2$(OH), —S—S(O)$_2$(OR$^3$), and a primary, secondary, tertiary amine —$NR^3_2$ or phosphine —$PR^3_2$, and an acid addition salt of an amine, phosphine preferably salts having quaternary —$N^+R^1_3$ or —$P^+R^1_3$ groups, wherein $R^3$ as defined above, whereby -$L^2$-$Z^2$ and -$L^1$-$Z^1$ are different.

Examples for the possible substituted oxyaromatic compounds include, but are not limited to: 1-allyl-3.4-dihydroxy benzene (allyl catechol), unsaturated monoether of monohydroxy compounds, i.e. 1-allyl-3-methoxy-4-hydroxy benzene (eugenol), unsaturated bis-silyl compounds, i.e. the bis-alkoxysilyl derivatives of 1-allyl-3.4 dihydroxy benzene. It assumed where necessary that the Si—O—C bonds are useful as a potential blocking group and can release further hydroxyl aryl groups or make the hydroxyl aryl groups accessible for other condensation reactions. The group of C5-C12-hetero-N, —O, —S-aryl may include indoles, carbazole, furanes, thiophenes.

In a more specific embodiment, the polyorganosiloxane is as follows:

$R^1$ is selected of methyl, phenyl, 3,3,3-trifluoropropyl

L is selected from $L^1$ and $L^2$ and is as defined above, $Z^1$ and $Z^2$ are selected from Z is phenyl, phenylpropyl, styryl, naphthyl, eugenol, bisphenolethers, cumylphenolether, and of unsubstituted or substituted oxyphenyl moieties of the formula

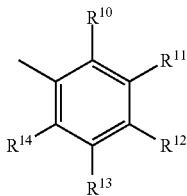

wherein $R^{10}$, $R^{14}$ is hydrogen or $R^1$ and $R^{11}$, $R^{12}$, $R^{13}$ are selected from —$OR^3$, whereby at least two of the groups $R^{11}$ to $R^{13}$ are OH groups, and norbornyl, vinyl, allyl, allyloxypropyl, hexenyl, norbornenyl, cyclohexenylethyl, limonyl, and glycidylpropylether, epoxylimonyl, epoxycyclohexanethyl, epoxynorbornyl, and the carbonate derivatives of these epoxides, and a group selected from Cl, —S—H, —NCO, blocked NCO, and a group selected from $(R^1X)_xR^1{}_{3-x}Si$—, $R^6{}_xR^1{}_{3-x}Si$—, wherein x=1-3, wherein X is =OH, $OR^1$, —$NR^1{}_2$—, $R^1$—C(O)—O—, wherein $R_6$=phenyl, naphthyl, phenylethyl, phenylpropyl, eugenol, limonyl, epoxylimonyl, glycidylpropylether epoxycyclohexylethyl, norbornenylethyl, epoxy norbornenylethyl, carbazol, indol, and selected from an ionic group derived from an ester of a carboxylic acid, S or P acid such as —C(O)—O—$R^3$, $(R^3O)_2$—P(O)—O—, $(R^3O)_2$—P(O)—, phosphonates $(R^3$—O)$_2$—P—, amines, betaines such as —$NHR^3$—$CH_2$—COOH, —$NHR^3$—$CH_2$—O—$S(O)_2$(OH), and a primary, secondary, tertiary amine —$NR^3{}_2$, and an acid addition salt of an amine, salts having quaternary —$N^+R^1{}_3$ and enamines, bonded via a single bond or carbon bond of L to the silicon atom of the siloxy unit, whereby -$L^2$-$Z^2$ and -$L^1$-$Z^1$ are different.

In a further specific second embodiment, the polyorganosiloxane is defined is as follows:

$Z^1$ is an alkoxysilyl substituent of the structure $(R^1O)_xR^1{}_{3-x}Si$ with x=1 to 3, $R^1$=C1-C8-alkyl, and of unsubstituted or substituted oxyphenyl moieties of the formula

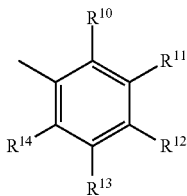

wherein $R^{10}$, $R^{14}$ is hydrogen or $R^1$ and $R_{11}$, $R^{12}$, $R^{13}$ are selected from —$OR^3$, whereby at least two of the groups $R^{11}$ to $R^{13}$ are OH, and selected from an ionic group derived from an ester of a carboxylic acid, S or P acid such as —C(O)—O—H, $(HO)_2$—P(O)—O—, $(HO)_2$—P(O)—, phosphonates (H—O)$_2$—P—, amines, betaines such as —$NHR^3$—$CH_2$—COOH, —$NHR^3$—$CH_2$—O—$S(O)_2$(OH), and a primary, secondary, tertiary amine —$NR^3{}_2$ and an acid addition salt of an amine, salts having quaternary —$N^+R^1{}_3$ and enamines, bonded via a single bond or carbon bond of L to the silicon atom of the siloxy unit, $Z^2$ is selected from the group of phenyl, phenylpropyl, styryl, naphthyl, eugenol, bisphenolethers, cumylphenolether, norbornyl, vinyl, allyl, allyloxypropyl, hexenyl, octenyl norbornenyl, cyclohexenylethyl, limonyl, glycidylpropylether, epoxylimonyl, epoxycyclohexanethyl, epoxynorbornyl, and the carbonate derivatives of these epoxides and C4-C23-carbonate groups thereof, and —C(O)—O—$R^3$, $(R^3O)_2$—P(O)—O—, $(R^3O)_2$—P(O)—, phosphonates $(R^3$—O)$_2$—P—, wherein $R^3$=$R^1$, and a group selected from Cl, —SH, —NCO, blocked NCO, and a group selected from triphenylsilyl, and $R^6R^1{}_2Si$—, wherein $R^6$ is phenyl, naphthyl, phenylethyl, phenylpropyl, eugenol, limonyl, epoxylimonyl, glycidylpropylether epoxycyclohexylethyl, norbornenylethyl, epoxy norbornenylethyl, carbazol, indol, whereby L-$Z^2$ and -L-$Z^1$ are different.

It will be appreciated that the statement L-$Z^2$ and L-$Z^1$ are different means that at least the $Z^2$ and $Z^1$ groups are different. The L groups may be the same or different.

In another third specific embodiment, the polyorganosiloxane is such that the substituents are defined by:

$L^1$ is —$CH_2CH_2$—;

$L^2$ is a single bond, —$CH_2CH_2$—, —$CH_2CH_2O$—, —$CH_2CH_2CH_2O$—, —$CH(CH_3)CH_2O$—, —CH=$CHCH_2O$—, —CH=CHC(O)—, or —C($CH_2O$—)=$CHCH_2O$—

$Z^1$ is as defined above, $Z^2$ is selected from —CH=$CH_2$, —$CH_2CH$=$CH_2$, —$(CH_2)_4CH$=$CH_2$, —C(O)$(CH_2)_8$CH=$CH_2$, —$CH_2$C≡CH, —C(O)C≡CH, —(OCH$_2$CH$_2$)$_a$—(OCH$_2$CH(CH$_3$))$_b$—(OCH$_2$CH$_2$CH(CH$_3$))$_c$—OCH=CH$_2$,
—(OCH$_2$CH$_2$O)$_a$—(OCH$_2$CH(CH$_3$))$_b$—(OCH$_2$CH$_2$CH(CH$_3$))$_c$—OCH$_2$CH=CH$_2$,
—(OCH$_2$CH$_2$)$_a$—(OCH$_2$CH(CH$_3$))$_b$—(OCH$_2$CH$_2$CH(CH$_3$))$_c$—OH
—(OCH$_2$CH$_2$)$_a$—(OCH$_2$CH(CH$_3$))$_b$—(OCH$_2$CH$_2$CH(CH$_3$))$_c$—O—C1-C4 alkyl
—(OCH$_2$CH$_2$)$_a$—(OCH$_2$CH(CH$_3$))$_b$—(OCH$_2$CH$_2$CH(CH$_3$))$_c$—O—C(O)—C1-C4 alkyl with a, b, c being 0 to 20, in one embodiment, 0 and 1 to 20, and a+b+c=1 to 20, —[—Si(CH$_3$)$_2$OSi(CH$_3$)$_2$]CH=CH$_2$, and

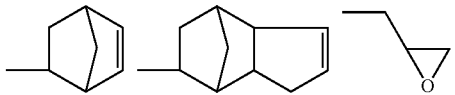

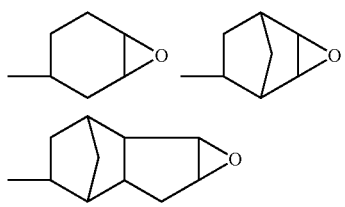

The aryl groups Z and R⁶ may include thio substituted cycloalkyl substituents

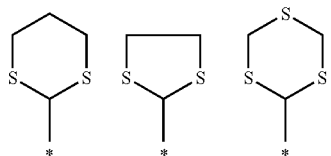

1,3-dithiane, 1,3-dithiolane, 1,3,5-trithiane, or aryl ethers such as

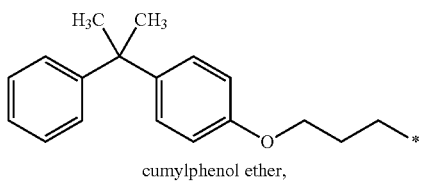

cumylphenol ether,

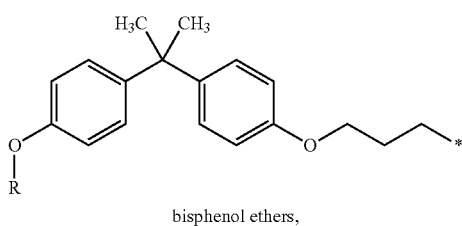

bisphenol ethers, and asymmetrically substituted disiloxanes such as

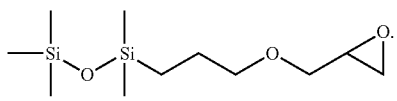

(IV)

In a further forth specific embodiment, the substituents $Z^1$ of the polyorganosiloxane are preferably selected from an ionic group, whereby:

$Z^1$ is selected from the group which consists of an unsubstituted primary, secondary, tertiary amine —$NR^3_2$ or ammonium groups —$N^+R^3_3$ or primary, secondary, tertiary phosphine —$PR^3_2$ or phosphonium —$P^+R^3_3$; an alkyl or aryl enamine of the formula,

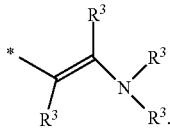

Preferably the groups ammonium group $N^+R^3_3$ and phosphonium group —$P^+R^3_3$; is a quaternary group $N^+R^1_3$ and phosphonium group —$P^+R^1_3$.

In a further specific fifth embodiment of the polyorganosiloxane, one group of the substituent $Z^1$ or $Z^2$ of the inventive polyorganosiloxane is defined as follows: $Z^2$ or $Z^1$ are selected from the group which consists of an ester of a carboxylic acid of the formula: —COO—$R^3$, a sulfonic acid —$SO_3$—$R^3$; a sulfuric acid partial ester —O—S(O)2-O—$R^3$, a phosphoric acid esters —O—P(O)(OR³)₂, a phosphonic acid esters —P(OR³)₂, a xanthogenate ester —O—C(S)—S—$R^3$ wherein the ionic character depends on the definition of $R^3$. If $R^3$ is hydrogen these ester groups should be used as $Z^1$, if $R^3$ is $R^1$ these ester groups should be used preferably as $Z^2$ moieties. In case where the group $R^3$ is hydrogen such groups Z have a more ionic character and may be used preferably as group $Z^1$ which has a stronger interaction to inorganic surfaces, e.g. of metal oxide or hydroxide particle.

In a further specific sixth embodiment, the substituents of the polyorganosiloxane are defined by $Z^1$ is an alkoxysilyl substituent of the structure of $(R^1O)_xR^1_{3-x}Si$ with x=1 to 3, $R^1$=C1-C8-alkyl, aryl, such as methyl, ethyl, propyl, i-propyl, n-butyl, phenyl, and $Z^1$ is an ionic group selected from the group which consists of a carboxylic acid of the formula —COOH, a sulfonic acid —$SO_3H$, a sulfuric acid O—S(O)₂—OH, a phosphoric acid or partial ester —O—P(O)(OR¹)₂, a phosphonic acid or partial ester —P(OR¹)₂, a xanthogenate acid —O—C(S)—S—H, a Bunte Salt —S—S(O)₂OH, wherein $R^1$ is as defined above or the anions of these acidic groups.

In a further seventh most preferred embodiment, the polyorganosiloxane is a substituted pentaorganosiloxane wherein the index m in the formula (I) is =1, p=1 or 4 or 9 for more than 80 wt. % and R respectively $R^1$ are defined above, and the polyorganosiloxane is of the formula (Ia)

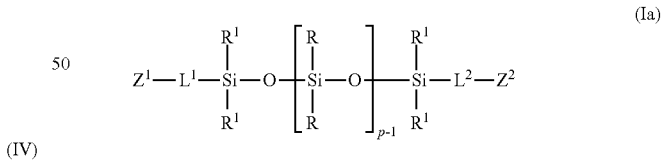

In an exemplary embodiment, the index p is 4 for more than 85 wt. % more preferably 90 wt. % of the inventive polyorganosiloxane.

Although it is in the scope of the invention to add and combine nearly all reactive groups Z as terminal group $Z^1$ and $Z^2$ attached to the selected polyorganosiloxane structures of formula (I) or (Ia), it is preferred to synthesize some specific combinations of the groups $Z^1$, $Z^2$ and if necessary $Z^{12}$ or $Z^{22}$, since most of properties for the intended uses can be achieved by these exemplified preferred combinations. The synthesis concept includes a final modification of the groups $Z^1$ and $Z^2$ to reveal the final character of these groups as $Z^{12}$ or $Z^{22}$ at a later stage of the synthesis.

The group $Z^{12}$ and $Z^{22}$ are selected from $Z^1$ or $Z^2$ and are characterized in that they are synthesized by an additional step in which a group $Z^2$ is submitted to a further reaction. For example an oxiranyl group is reacted with a primary, secondary or tertiary amine to form a ring opened hydroxyl amine or ammonium unit as group $Z^{22}$

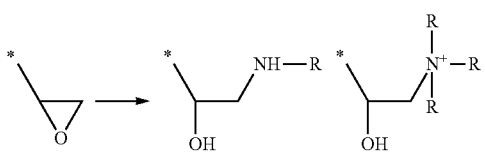

In another example the oxiranyl group is reacted with a carboxylic acid or any other acid, such as methacrylic acid, phosphoric acid etc. to form esters based as $Z^{22}$ on a previous group $Z^2$.

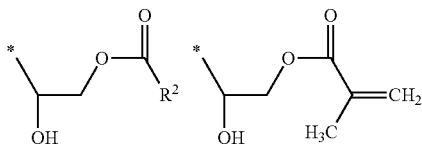

This third reaction step can also comprise a substitution reaction of an alkylhalogenide with an amine, a phosphine, a phosphinate etc., whereby the alkylhalogenide is preferably a group $Z^1$ or $Z^2$ attached to one of the embodiments of the inventive polyorganosiloxanes.

The following table shows exemplary combinations of the groups $Z^1$ and $Z^2$ in the inventive polyorganosiloxanes.

In a further specific embodiment, the substituents of the inventive polyorganosiloxane (I) have the definition of the formula (Ia), wherein the index m in the formula (I) is m=1

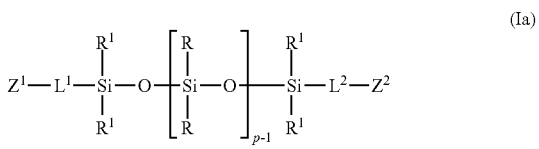

and R, $R^1$, $Z^1$, $L^1$, $Z^2$ and $L^2$ are as defined above.

Specific exemplary embodiments of the polyorganosiloxane (Ia) are polyorganosiloxanes selected from compounds of the formulas (IIa) to (IIf):

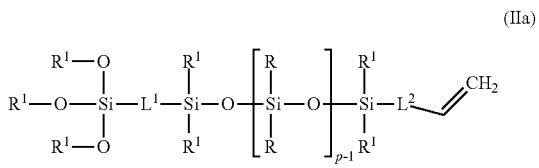

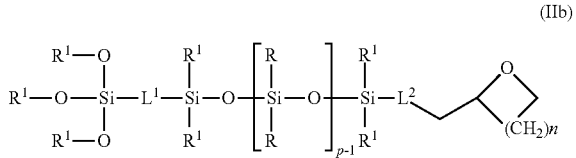

TABLE 1

| If $Z^1$ then→ | $Z^2$ | $Z^{22}$ |
|---|---|---|
| C3-C22-oxiranyl | —CH=CH$_2$ | |
| C4-C23-carbonate | —CH=CH$_2$ | |
| amino/ammonium —N$^+$R$^1_3$ | —CH=CH$_2$ | |
| —P$^+$R$^1_3$ | —CH=CH$_2$ | |
| CH=CH$_2$ | -oxiranyl | carboxylate/sulfate/sulfonate |
| (R$^1$X)$_x$R$^1_{3-x}$Si— | C2-C22 alkyl | |
| (R$^1$X)$_x$R$^1_{3-x}$Si— | —CH=CH$_2$ | |
| (R$^1$X)$_x$R$^1_{3-x}$Si— | oxiranyl | |
| (R$^1$X)$_x$R$^1_{3-x}$Si— | C2-C8-alkyl | |
| (R$^1$X)$_x$R$^1_{3-x}$Si— | Siph$_3$ | |
| (R$^1$X)$_x$R$^1_{3-x}$Si— | oxiranyl | —N$^+$R$^1_3$ |
| (R$^1$X)$_x$R$^1_{3-x}$Si— | trihydroxyphenyl | |
| (R$^1$X)$_x$R$^1_{3-x}$Si— | —(C$_2$H$_4$O)$_{1-6}$ (C$_3$H$_6$O)$_{1-6}$—R$^3$ or —(O C$_2$H$_4$)$_{1-20}$(O C$_3$H$_6$)$_{1-6}$—OH or —(O C$_2$H$_4$)$_{1-20}$(O C$_3$H$_6$)$_{1-6}$—O-C1-C4 alkyl Or —(O C$_2$H$_4$)$_{1-20}$(OC$_3$H$_6$)$_{1-6}$—O—C(O)-C1-C4 alkyl | |
| (R$^1$X)$_x$R$^1_{3-x}$Si— | oxiranyl | —C(O)—OR$^3$ |
| (R$^1$X)$_x$R$^1_{3-x}$Si— | —(CH$_2$)$_{1-12}$—Cl | (R$^3$—O)$_2$—P— |
| trihydroxydroxyphenyl | oxiranyl | |

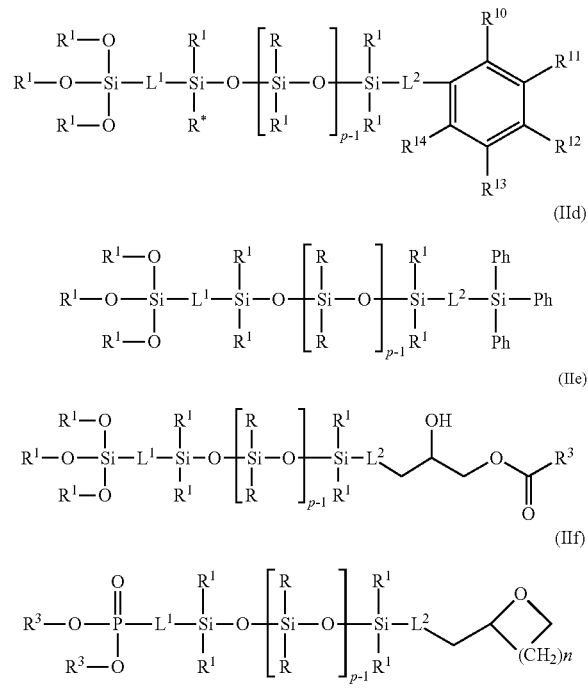

R, R¹=methyl, 3,3,3-fluoropropyl, phenyl but can be different to each other, p=1 or 4 or 9, n=0-6, and L¹ and L² are selected from the group of C1-C14-alkyl, C1-C14-alkylether groups and can be different to each other.

The combination of the two different terminal groups $Z^1$ and $Z^2$ is chosen under a concept which is taking into account the possible applications of the inventive polyorganosiloxane.

For the case where an interaction to an oxidic inorganic filler is desired, it is preferred to choose at least one first terminal group which is capable of interacting with such filler surfaces. Suitable groups include, but are not limited to, silyl groups having hydrolysable leaving groups X such as alkoxy, amino or carboxylic groups or are further ionic groups Z like ammonium, phosphonium, phosphate, sulfate or carboxylic groups as terminal group.

The use of silyl groups having hydrolysable leaving groups are also preferred if the polyorganosiloxanes are intended to be used in a cure process wherein a condensation reaction shall occur either without or with further polyorganosiloxanes which can undergo a condensation reaction together with a condensation catalyst known in the state of the art in the field of RTV-1K or RTV-2K polysiloxane compositions. Such condensation catalyst maybe selected from organometallic compounds such as compounds comprising Bi, Fe, Sn, Ti, Zr, Zn or amines and Lewis acids. Another first terminal group $Z^1$ is a hydroxyaromatic group, which can interact with many of the inorganic oxide or hydroxide surfaces. The use of polyalkylene oxide groups as $Z^2$ group is suitable for an improved wetting behavior and can provide antifouling properties. Such surfaces when modified with the inventive polyorganosiloxanes may include surfaces of inorganic oxides or organic polymers or surfaces like inorganic or organic fibers or coatings in order to modify these surfaces in a desired manner. Examples of modifications include, but are not limited to, changing the surface tension, changing the wettability, or providing a surface which exhibits repellence against microbes, algae's, biofilms, barnicles, fungis etc., i.e., it can be used therefore as an anti-fouling coating per se or as an additive in a polyorganosiloxane composition cured by a condensation reaction.

The second terminal group $Z^2$ to be combined with the aforementioned first terminal group may be selected from the group of substituents which can undergo different types of reactions compared to the first terminal group. Such second terminal substituents are preferably selected from the group consisting of substituents which can be activated by, e.g., by a radical initiated reaction and a heat or light activated hydrosilylation reaction of unsaturated groups with SiH groups, condensation and substitution reaction of the SN-type, such as oxiranyl ring-opening reactions with amines or light activated cationic polymerization with onium and sensitizer compounds for the transfer of light energy. Therefore such terminal substituents will be chosen preferable from the group of unsaturated, or e.g. —SH, SiH, oxiranyl or carbonate substituents $R^2$, $Z^2$ or $Z^{22}$ linked over a unit L via carbon bond to the silicon atom of a disiloxane, pentasiloxane or decasiloxane block.

The broad range of possible reactive terminal substituents enables the use of various cure mechanism either nucleophiles like amines and an epoxy ring opening reaction or by light induced cationic polymerization under assistance of a catalyst, heat or light activated radial reaction and hydrosilylation reaction. Some groups can be again precursor for other reactive groups, e.g. where epoxides are reacted with e.g. carboxylic acids to form esters or with amines to form higher alkylated amines.

By such a reaction, e.g. the epoxy groups $Z^2$ can in particular be transformed to substituents $Z^{22}$ having unsaturated groups like unsaturated esters —C(O)—OR².

The strategy for the sequence of the stepwise introduction of the terminal groups depends on the reactive groups of the precursors and possible interactions between the first and the second terminal group in the synthesis for building-up the asymmetrically substituted polyorganosiloxane.

Another aspect in the concept of the synthesis is the additional use of a binder or matrix polymer which is intended for a combined cure with the inventive polyorganosiloxane in order form coatings or article.

In one embodiment, the inventive polyorganosiloxanes may be used to form a coating or as part of a coating composition. In one exemplary embodiment, the inventive polyorganosiloxanes may be employed as an antifouling coating or as an ingredient in an antifouling coating. In embodiments where the polyorganosiloxane is employed as an antifouling coating or as part of an antifouling coating composition, the polyorganosiloxane may be of the formula (I) and comprise two different terminal groups $Z^1$ and $Z^2$

p=1 to 9, m=1 to 5 wherein

R=R¹ is a saturated hydrocarbon substituent selected from the group which consists of a monovalent C1 to C22-alkyl, a C6-C22-aryl, L is a single bond, divalent or trivalent group L¹ or L² which are selected from the group consisting of a divalent C1-C12-alkylene group or divalent or trivalent C1-C12-alkylidene group which can be interrupted by one or more —O—, —C(O)—, —NR³—C(O)—, and/or —NR³—, urethane-OC(O)NR³—, urea —N—R³HC(O)N—R³— moieties, and substituted by one or more OH groups,
wherein R³ is hydrogen, Me₃Si— or C1-C8 alkyl, bonded via carbon bond to the silicon atom of the siloxy unit
Z is a monovalent group selected from the group Z¹ and Z²,
wherein
Z¹ and Z² are selected from the group which consists of
a) unsubstituted or substituted, linear, branched or cyclic, saturated or unsaturated C1-C30 hydrocarbons, i.e. C3-C22 linear alkyl, C3-C22 branched alkyl, C8-C22-alkylarylalkyl, C6-C22-aryl ether, C6-C22-cycloalkyl, C7-C22-cycloalkylalkylene, C7-C22-bicycloalkyl,
b) poly-C2-C4-alkylene oxides, OH or OR³ or OC(O)R³ terminated, and wherein R³ is selected from C1-C8 alkyl,
c) a group selected from
(R¹X)ₓR¹₃₋ₓSi—, wherein x=1-3, wherein
X is =O—, —C(O)—O—, wherein
R¹ is as defined above,
under the proviso that one group Z¹ or Z² is a group selected from c).

In a second exemplary embodiment of the polyorganosiloxanes being useful as antifouling coating or ingredient in antifouling coatings, the polyorganosiloxane may be of the formula (I) and comprise two different terminal groups Z¹ and Z²

$$Z^1\text{-}\{\text{-}L[SiR_2O]_p\text{—}SiR_2\}_m\text{-}L\text{-}Z^2 \tag{I}$$

p=1 to 4,
m=1 to 2
wherein
R=R¹ is a saturated hydrocarbon substituent selected from the group which consists of a monovalent C1 to C3-alkyl, a C6 aryl,
L is a divalent or trivalent group L¹ or L² which are selected from the group consisting of a divalent C1-C8-alkylene group or divalent or trivalent C1-C6-alkylidene group which can be interrupted by one or more —O—, —C(O)— moieties, and substituted by one or more OH groups,
specifically
—CH₂CH₂—,
—CH₂CH₂O—, CH₂CH₂CH₂O—, —CH(CH₃)CH₂O—,
—CH₂CH₂CH(CH₃)CH₂O—,
—CH═CH—CH₂O—,

—CH₂CH₂OC(O)—, CH₂CH₂CH₂OC(O)—, —CH(CH₃)CH₂O—, —CH₂CH₂CH(CH₃)CH₂OC(O)—,
—CH═CH—CH₂OC(O)—,

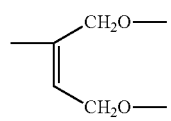

Z is a monovalent group selected from the group Z¹ and Z²,
wherein
Z¹ and Z² are selected from the group which consists of
a) unsubstituted or substituted, linear, branched or cyclic, saturated or unsaturated C1-C22 hydrocarbons, i.e. C3-C18 linear alkyl, C3-C18 branched alkyl, C8-C15-alkylarylalkyl, C6-C9-aryl ether, C6-C10-cycloalkyl, C7-C18-cycloalkylalkylene, C7-C16-bicycloalkyl,
specifically
—(CH₂)₁₀CH₃, —(CH₂)₁₂CH₃, —(CH₂)₁₄CH₃, —(CH₂)₁₆CH₃,
—(CH₂)₇CH═CH(CH₂)₇CH₃,
—CH(C₂H₅)CH₂CH₂CH₂CH₃,
Koch acids derived residues, i.e.
—C(CH₃)₃, —C(CH₃)₂CH₂CH₃,
—C(CH₃)₂CH2CH₂CH₃,
Versatic acid 11 derived residues of the structure
—C(CH₃)R¹R¹ with Σ carbons in all R¹ groups=8,
Versatic acid 10 derived residues of the structure
—C(CH₃)R¹R¹ with Σ carbons in all R¹ groups=7,
i.e.
—C(CH₃)(C₂H₅)CH₂CH₂CH₂CH₂CH₃,
—C(CH₃)(C₃H₇)(C₄H₉),
Versatic acid 9 derived residues of the structure
—C(CH₃)R¹R¹ with Σ carbons in all R¹ groups=6,

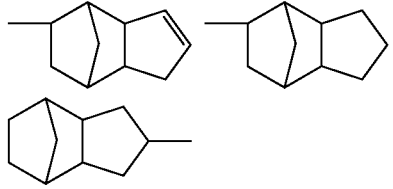

b) poly-C2-C4-alkylene oxides, OH or OR³ or OC(O)R³ terminated, of the structures
—(OCH₂CH₂—)ₐ—(OCH₂CH(CH₃))ᵦ—(OCH₂CH2CH(CH₃))ᵧ—OH
—(OCH₂CH₂)ₐ—(OCH₂CH(CH₃))ᵦ—(OCH₂CH₂CH(CH₃))ᵧ—O—C1-C4 alkyl
—(OCH₂CH₂)ₐ—(OCH₂CH(CH₃))ᵦ—(OCH₂CH₂CH(CH₃))ᵧ—O—C(O)—C1-C4 alkyl
with a, b, c being 0 to 20, and a+b+c=1 to 20,
a being preferred 2 to 20, more preferred 5 to 20, even more preferred 7 to 20 and specifically 7 to 15,
b being preferred 0 to 20, more preferred 0 to 10, even more preferred 0 to 5 and specifically 1 to 5,
c being preferred 0 to 20, more preferred 0 to 10, even more preferred 0 to 5 and specifically 1 to 5,
a+b+c being preferred 2 to 20, more preferred 5 to 20, even more preferred 7 to 20 and specifically 7 to 15,
c) a group selected from
(R¹X)ₓR¹₃₋ₓSi—, wherein x=1-3, wherein
X is =O—, —C(O)—O—, wherein
R¹ is as defined above, preferred CH₃— and CH₃CH₂—,
under the proviso that one group Z¹ or Z² is a group selected from c).

In a further third exemplary embodiment, the polyorganosiloxanes employed as antifouling coating or ingredient in antifouling coatings are of the formula (I) and comprise two different terminal groups Z¹ and Z²

p=4,
m=1,
wherein
R=$R^1$ is a saturated hydrocarbon substituent selected from the group which consists of a monovalent C1 to C3-alkyl, preferred methyl,
L is a divalent or trivalent group $L^1$ or $L^2$ which are selected from the group consisting of a divalent C1-C4-alkylene group, preferred divalent C2-C3 alkylene group, which can be interrupted by one or more —O—, —C(O)— moieties, and substituted by one or more OH groups,
specifically
—$CH_2CH_2$—,
—$CH_2CH_2O$—, $CH_2CH_2CH_2O$—, —$CH(CH_3)CH_2O$—, —$CH_2CH_2CH(CH_3)CH_2O$—,
Z is a monovalent group selected from the group $Z^1$ and $Z^2$,
wherein
$Z^1$ and $Z^2$ are selected from the group which consists of
a) unsubstituted branched saturated C1-C22 hydrocarbons, i.e. C3-C18 branched alkyl, specifically
Koch acids derived residues, i.e.
—$C(CH_3)_3$, —$C(CH_3)_2CH_2CH_3$, —$C(CH_3)_2CH_2CH_2CH_3$,
Versatic acid 11 derived residues of the structure
—$C(CH_3)R^1R^1$ with Σ carbons in all $R^1$ groups=8,
Versatic acid 10 derived residues of the structure
—$C(CH_3)R^1R^1$ with Σ carbons in all $R^1$ groups=7, i.e.
—$C(CH_3)(C_2H_5)CH_2CH_2CH_2CH_2CH_3$,
—$C(CH_3)(C_3H_7)(C_4H_9)$,
Versatic acid 9 derived residues of the structure
—$C(CH_3)R^1R^1$ with Σ carbons in all $R^1$ groups=6,
c) a group selected from
$(R^1X)_xR^1{}_{3-x}Si$—, wherein x=1-3, preferred 3, wherein
X is =—O—, wherein
$R^1$ is as defined above, preferred $CH_3$— and $CH_3CH_2$—,
under the proviso that one group $Z^1$ or $Z^2$ is a group selected from c).

In a further fourth exemplary embodiment, the polyorganosiloxanes employed as antifouling coating or ingredient in antifouling coatings are of the formula (I) and comprise two different terminal groups $Z^1$ and $Z^2$

  (I)

p=4,
m=1,
wherein
R=$R^1$ is a saturated hydrocarbon substituent selected from the group which consists of a monovalent C1 to C3-alkyl, preferred methyl,
L is a divalent or trivalent group $L^1$ or $L^2$ which are selected from the group consisting of a divalent C1-C4-alkylene group, preferred divalent C2-C3 alkylene group, which can be interrupted by one or more —O—, —C(O)— moieties, and substituted by one or more OH groups,
specifically
—$CH_2CH_2$—,
—$CH_2CH_2O$—, $CH_2CH_2CH_2O$—, —$CH(CH_3)CH_2O$—, —$CH_2CH_2CH(CH_3)CH_2O$—,
Z is a monovalent group selected from the group $Z^1$ and $Z^2$,
wherein
$Z^1$ and $Z^2$ are selected from the group which consists of
b) poly-C2-C4-alkylene oxides, OH or $OR^3$ or $OC(O)R^3$ terminated, of the structures
—$(OCH_2CH_2—)_a$—$(OCH_2CH(CH_3))_b$—$(OCH_2CH_2CH(CH_3))_c$—OH
—$(OCH_2CH_2)_a$—$(OCH_2CH(CH_3))_b$—$(OCH_2CH_2CH(CH_3))_c$—O—C1-C4 alkyl
—$(OCH_2CH_2)_a$—$(OCH_2CH(CH_3))_b$—$(OCH_2CH_2CH(CH_3))_c$—O—C(O)—C1-C4 alkyl with a, b, c being 0 to 20, and a+b+c=1 to 20,
a being preferred 2 to 20, more preferred 5 to 20, even more preferred 7 to 20 and specifically 7 to 15,
b being preferred 0 to 20, more preferred 0 to 10, even more preferred 0 to 5 and specifically 1 to 5,
c being preferred 0 to 20, more preferred 0 to 10, even more preferred 0 to 5 and specifically 1 to 5,
a+b+c being preferred 2 to 20, more preferred 5 to 20, even more preferred 7 to 20 and specifically 7 to 15,
c) a group selected from
$(R^1X)_xR^1{}_{3-x}Si$—, wherein x=1-3, preferred 3, wherein
X is =—O—, wherein
$R^1$ is as defined above, preferred $CH_3$— and $CH_3CH_2$—,
under the proviso that one group $Z^1$ or $Z^2$ is a group selected from c).

In a further fifth exemplary embodiment, the polyorganosiloxanes employed in antifouling coatings or additives to antifouling coatings are mixtures of (i) a polyorganosiloxane which comprises for Z with $Z^1$ and $Z^2$ substituents a) and c), and (ii) a polyorganosiloxane which comprises for Z with $Z^1$ and $Z^2$ substituents b) and c). The wt % ratio between the polyorganosiloxanes (i) which comprise for Z with $Z^1$ and $Z^2$ substituents a) and c) and polyorganosiloxanes (ii) which comprise for Z with $Z^1$ and $Z^2$ substituents b) and c) is: polyorganosiloxanes (i):polyorganosiloxanes (ii)=10:90 to 90:10; 30:70 to 70:30; 40:60 to 60:40, even 50:50.

α,ω difunctional polysiloxanes in antifouling compositions are described in WO2014/126599 which is herewith included by reference. The polysiloxanes contain alkoxysilyl as well as polyether substituents. Major disadvantage of the polysiloxanes in WO2014/126599 is the polydispersity of the siloxane. This leads after two subsequent hydrosilylations with unsaturated alkoxysilanes and unsaturated polyethers without the chance for a purification of the intermediate to a broad product mix. It contains the target product as well as the two undesired symmetrically substituted species. Further, each of these three product types is polydisperse due to the character of the starting SiH siloxane.

The polysiloxanes according to the invention may be considered α,ω difunctional polysiloxanes and circumvent the above described disadvantage. The starting SiH siloxane is monodisperse. This allows the purification of the monofunctional intermediate and thus the formation of a strictly asymmetrically substituted α,ω difunctional polysiloxane containing a monodisperse siloxane moiety.

Details on the incorporation of the inventive α,ω difunctional polysiloxanes or their mixtures into coating formulations are described in WO2014/126599. Further details are illustrated by the corresponding non limiting examples.

Catalysts used for the condensation reaction are selected from the group of a variety of organometallic compounds preferably organo tin, titanium, zinc, iron, bismuth, calcium compounds but one can also use Lewis or Broensted acids or bases.

A preferred class of organometallic compounds includes salts like dialkyltin oxides, reaction products of dialkyltinoxide with tetraalkoxysilanes, dibutyltindilaurate, stannous octoate, dibutyltin dioctoate, zinc octoate and other zinc complexes as K-KAT 670 (King Industries), bismuth complexes like K-KAT XK-651 (King Industries), tetraalkoxy titanates, titanium acetylacetonate chelate derivatives as diisopropoxy-bis(ethylacetoacetato)titanate or alkoxy titanium chelates of $C_1$-$C_{10}$ carboxylic residues, etc. Specific examples of such catalysts are set forth and disclosed in column 3, lines 19-54 of U.S. Pat. No. 3,527,659 which is incorporated herein by reference. A particular useful curing catalyst for polyorganosiloxanes having silane groups in this invention are quaternary ammonium salts such as benzyltrimethylammonium compounds like acetate, tetraalkylammonium acetate or other see U.S. Pat. No. 3,819,745.

The polyorganosiloxanes are also suitable for use in compositions for other applications. In embodiments, the polyorganosiloxanes may be employed as a component in an antifog coating composition. In one exemplary embodiment, the polyorganosiloxanes employed as a component in an antifog coating is of the formula (I) and comprises two different terminal groups $Z^1$ and $Z^2$

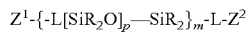 (I)

p=1 to 9,
m=1 to 5
wherein
R=$R^1$ is a saturated hydrocarbon substituent selected from the group which consists of a monovalent C1 to C22-alkyl, a C6-C22-aryl,
L is a single bond, divalent or trivalent group $L^1$ or $L^2$ which are selected from the group consisting of a divalent C1-C12-alkylene group or divalent or trivalent C1-C12-alkylidene group which can be interrupted by one or more —O—, —C(O)—, —$NR^3$—C(O)—, and/or —$NR^3$—, urethane-OC(O)$NR^3$—, urea —N—$R^3$HC(O)N—$R^3$— moieties, and substituted by one or more OH groups,
wherein $R^3$ is hydrogen, $Me_3Si$— or C1-C8 alkyl,
bonded via carbon bond to the silicon atom of the siloxy unit
Z is a monovalent group selected from the group $Z^1$ and $Z^2$,
wherein
$Z^1$ and $Z^2$ are selected from the group which consists of
b) poly-C2-C4-alkylene oxides, OH or $OR^3$ or OC(O)$R^3$ terminated, and wherein
$R^3$ is selected from C1-C8 alkyl,
c) a group selected from
$(R^1X)_xR^1_{3-x}Si$—, wherein x=1-3, wherein
X is —O—, —C(O)—O—, wherein
$R^1$ is as defined above,
under the proviso that one group $Z^1$ and $Z^2$ is a group selected from c).

In a further second exemplary embodiment of the polyorganosiloxanes as a component in antifog coatings, the polyorganosiloxane is of the formula (I) and comprises two different terminal groups $Z^1$ and $Z^2$

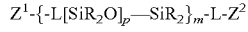 (I)

p=1 to 4,
m=1 to 2
wherein
R=$R^1$ is a saturated hydrocarbon substituent selected from the group which consists of a monovalent C1 to C3-alkyl, a C6 aryl,
L is a divalent or trivalent group $L^1$ or $L^2$ which are selected from the group consisting of a divalent C1-C8-alkylene group or divalent or trivalent C1-C6-alkylidene group which can be interrupted by one or more —O—, —C(O)— moieties, and substituted by one or more OH groups,
specifically
—$CH_2CH_2$—,
—$CH_2CH_2O$—, $CH_2CH_2CH_2O$—, —$CH(CH_3)CH_2O$—, —$CH_2CH_2CH(CH_3)CH_2O$—, —CH=CH—$CH_2O$—,

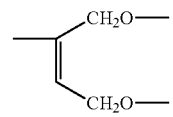

—$CH_2CH_2OC(O)$—, $CH_2CH_2CH_2OC(O)$—, —$CH_2CH_2CH(CH_3)CH_2OC(O)$—,
—CH=CH—$CH_2OC(O)$—,

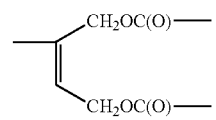

Z is a monovalent group selected from the group $Z^1$ and $Z^2$,
wherein
$Z^1$ and $Z^2$ are selected from the group which consists of
b) poly-C2-C4-alkylene oxides, OH or $OR^3$ or OC(O) $R^3$ terminated, of the structures
—$(OCH_2CH_2$—$)_a$—$(OCH_2CH(CH_3))_b$—$(OCH_2CH_2CH(CH_3))_c$—OH
—$(OCH_2CH_2)_a$—$(OCH_2CH(CH_3))_b$—$(OCH_2CH_2CH(CH_3))_c$—O—C1-C4 alkyl
—$(OCH_2CH_2)_a$—$(OCH_2CH(CH_3))_b$—$(OCH_2CH_2CH(CH_3))_c$—O—C(O)—C1-C4 alkyl
with a, b, c being 0 to 20, and a+b+c=1 to 20,
a being preferred 2 to 20, more preferred 5 to 20, even more preferred 7 to 20 and specifically 7 to 15,
b being preferred 0 to 20, more preferred 0 to 10, even more preferred 0 to 5 and specifically 1 to 5,
c being preferred 0 to 20, more preferred 0 to 10, even more preferred 0 to 5 and specifically 1 to 5,
a+b+c being preferred 2 to 20, more preferred 5 to 20, even more preferred 7 to 20 and specifically 7 to 15,
c) a group selected from
$(R^1X)_xR^1_{3-x}Si$—, wherein x=1-3, wherein
X is —O—, —C(O)—O—, wherein
$R^1$ is as defined above, preferred $CH_3$— and $CH_3CH_2$—,
under the proviso that one group $Z^1$ or $Z^2$ is a group selected from c).

In a further third exemplary embodiment of the polyorganosiloxanes as a component in antifog coatings, the polyorganosiloxane is of the formula (I) and comprises two different terminal groups $Z^1$ and $Z^2$ $$Z^1\text{-}\{\text{-}L[SiR_2O]_p\text{---}SiR_2\}_m\text{-}L\text{-}Z^2 \quad (I)$$

p=4,
m=1,
wherein
R=$R^1$ is a saturated hydrocarbon substituent selected from the group which consists of a monovalent C1 to C3-alkyl, preferred methyl,
L is a divalent or trivalent group $L^1$ or $L^2$ which are selected from the group consisting of a divalent C1-C4-alkylene group, preferred divalent C2-C3 alkylene group, which can be interrupted by one or more —O—, —C(O)— moieties, and
substituted by one or more OH groups,
specifically
—CH$_2$CH$_2$—,
—CH$_2$CH$_2$O—, CH$_2$CH$_2$CH$_2$O—, —CH(CH$_3$)CH$_2$O— CH$_2$CH$_2$CH(CH$_3$)CH$_2$O—,
Z is a monovalent group selected from the group $Z^1$ and $Z^2$,
wherein
$Z^1$ and $Z^2$ are selected from the group which consists of
b) poly-C2-C4-alkylene oxides, OH or $OR^3$ or OC(O) $R^3$ terminated, of the structures
—(OCH$_2$CH$_2$—)$_a$—(OCH$_2$CH(CH$_3$))$_b$— (OCH$_2$CH$_2$CH(CH$_3$))$_c$—OH
—(OCH$_2$CH$_2$)$_a$—(OCH$_2$CH(CH$_3$))$_b$—(OCH$_2$CH$_2$CH (CH$_3$))$_c$—O—C1-C4 alkyl
—(OCH$_2$CH$_2$)$_a$—(OCH$_2$CH(CH$_3$))$_b$—(OCH$_2$CH$_2$CH (CH$_3$))$_c$—O—C(O)—C1-C4 alkyl
with a, b, c being 0 to 20, and a+b+c=1 to 20,
a being preferred 2 to 20, more preferred 5 to 20, even more preferred 7 to 20 and specifically 7 to 15,
b being preferred 0 to 20, more preferred 0 to 10, even more preferred 0 to 5 and specifically 0 and 1 to 5,
c being preferred 0 to 20, more preferred 0 to 10, even more preferred 0 to 5 and specifically 0 and 1 to 5,
a+b+c being preferred 2 to 20, more preferred 5 to 20, even more preferred 7 to 20 and specifically 7 to 15,
c) a group selected from
$(R^1X)_xR^1_{3-x}Si$—, wherein x=1-3, preferred 3, wherein
X is =—O—, wherein
$R^1$ is as defined above, preferred CH$_3$— and CH$_3$CH$_2$—,
under the proviso that one group $Z^1$ or $Z^2$ is a group selected from c).

In a further fourth exemplary embodiment of the polyorganosiloxanes as a component in antifog coatings, the polyorganosiloxane is of the formula (I) and comprises two different terminal groups $Z^1$ and $Z^2$ chosen from substituents b) and c), under the proviso that one group $Z^1$ or $Z^2$ is a group selected from c):
b) silanes $(R^1X)_xR^1_{4-x}Si$, wherein x=1-4, wherein
X is =—O—, —OC(O)— wherein
$R^1$ is as defined above,
c) silanes $(R^1X)_xR^1_{3-x}Si$—$R^{10}$, wherein x=1-3, wherein
X is =—O—, —OC(O)— wherein
$R^1$ is as defined above,
$R^{10}$ is a monovalent group which is selected from the group consisting of a C2-C22-alkyl group which can be interrupted by one or more —O—, —C(O)—, —NR$^3$—C(O)—, and/or —NR$^3$—, urethane-OC(O) NR$^{3}$-, urea —N—R$^3$HC(O)N—R$^3$— moieties, and is substituted by at least one or more OH groups and $R^{10}$ is different from $R^1$,
wherein $R^3$ is hydrogen, Me$_3$Si— or C1-C8 alkyl.

In a further fifth exemplary embodiment of the polyorganosiloxanes as a component in anti fog coatings, the composition includes
A) polyorganosiloxanes comprising two different terminal groups $Z^1$ and $Z^2$ of the formula (I)

$$Z^1\text{-}\{\text{-}L[SiR_2O]_p\text{---}SiR_2\}_m\text{-}L\text{-}Z^2 \quad (I)$$

p=4,
m=1,
wherein
R=$R^1$ is a saturated hydrocarbon substituent selected from the group which consists of a monovalent C1 to C3-alkyl, preferred methyl,
L is a divalent or trivalent group $L^1$ or $L^2$ which are selected from the group consisting of a divalent C1-C4-alkylene group, preferred divalent C2-C3 alkylene group, which can be interrupted by one or more —O—, —C(O)— moieties, and substituted by one or more OH groups,
specifically
—CH$_2$CH$_2$—,
—CH$_2$CH$_2$O—, CH$_2$CH$_2$CH$_2$O—, —CH(CH$_3$)CH$_2$O—, —CH$_2$CH$_2$CH(CH$_3$)CH$_2$O—,
Z is a monovalent group selected from the group $Z^1$ and $Z^2$,
wherein
$Z^1$ and $Z^2$ are selected from the group which consists of
b) poly-C2-C4-alkylene oxides, OH or $OR^3$ or OC(O) $R^3$ terminated, of the structures
—(OCH$_2$CH$_2$—)$_a$—(OCH$_2$CH(CH$_3$))$_b$— (OCH$_2$CH$_2$CH(CH$_3$))$_c$—OH
—(OCH$_2$CH$_2$)$_a$—(OCH$_2$CH(CH$_3$))$_b$—(OCH$_2$CH$_2$CH (CH$_3$))$_c$—O—C1-C4 alkyl
—(OCH$_2$CH$_2$)$_a$—(OCH$_2$CH(CH$_3$))$_b$—(OCH$_2$CH$_2$CH (CH$_3$))$_c$—O—C(O)—C1-C4 alkyl
with a, b, c being 0 to 20, and a+b+c=1 to 20,
a being preferred 2 to 20, more preferred 5 to 20, even more preferred 7 to 20 and specifically 7 to 15,
b being preferred 0 to 20, more preferred 0 to 10, even more preferred 0 to 5 and specifically 0 and 1 to 5,
c being preferred 0 to 20, more preferred 0 to 10, even more preferred 0 to 5 and specifically 0 and 1 to 5,
a+b+c being preferred 2 to 20, more preferred 5 to 20, even more
preferred 7 to 20 and specifically 7 to 15,
c) a group selected from
$(R^1X)_xR^1_{3-x}Si$—, wherein x=1-3, preferred 3, wherein
X is =—O—, wherein
$R^1$ is as defined above, preferred CH$_3$— and CH$_3$CH$_2$—,
under the proviso that one group $Z^1$ or $Z^2$ is a group selected from c),
B) silanes $(R^1X)_xR^1_{4-x}Si$, wherein x=1-4, preferred 3, wherein
X is =—O—, wherein
$R^1$ is as defined above, preferred CH$_3$— and CH$_3$CH$_2$—
C) silanes $(R^1X)_xR^1_{3-x}Si$—$R^{10}$, wherein x=1-3, preferred 3, wherein
X is =—O—, wherein
$R^1$ is as defined above, preferred CH$_3$— and CH$_3$CH$_2$—,
$R^{10}$ is a monovalent group which is selected from the group consisting of a C2-C22-alkyl which can be interrupted by one or more —O—, —C(O)—, moieties, and is substituted by at least one or more OH groups and $R^{10}$ is different from $R^1$, $R^{10}$ preferred has the formula -L-$Z^3$, wherein L is as above defined, preferred a divalent or trivalent group which is selected from the group consisting of a divalent C1-C9-alkylene group or divalent or trivalent C1-C6-alkylidene group which can be interrupted by one or more —O—, —C(O)— moieties, and substituted by one or more OH groups, specifically —CH$_2$CH$_2$O—, CH$_2$CH$_2$CH$_2$O—, —CH$_2$CH(CH$_3$)O—, —CH$_2$CH$_2$CH(CH$_3$)CH$_2$O—,

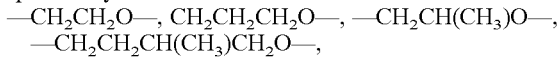

—CH=CH—CH$_2$O—,

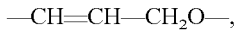

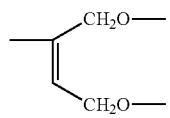

—CH$_2$CH$_2$OC(O)—,      —CH$_2$CH$_2$CH$_2$OC(O)—,
—CH$_2$CH(CH$_3$)O—,      —CH$_2$CH$_2$CH(CH$_3$)CH$_2$OC(O)—, —CH$_2$CH$_2$CH$_2$OCH$_2$CH(OH)CH$_2$OC(O)—,

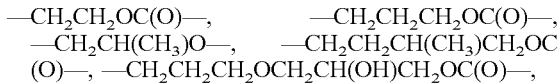

—CH=CH—CH$_2$OC(O)—,

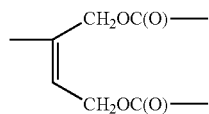

$Z^3$ is a group which is selected from the group consisting of a divalent C1-C18-alkyl group or C1-C10-alkylidene group which can be interrupted by one or more —O—, —C(O)— moieties, and is substituted by one or more OH groups, preferred 1 to 10 OH groups, more preferred 1 to 7 OH groups, even more preferred 1 to 5 OH groups.

Preferred examples for the group $Z^3$ are derived from hydroxyl functionalized carboxylic acids, i.e.

C2 to C12, preferred C2 to C9 saturated or unsaturated hydroxyalkyl carboxylic acids, i.e. glycolic acid, lactic acid, β-hydroxy butyric acid, γ-hydroxy butyric acid, 2-hydroxy-succinic acid, citric acid, mandelic acid, C2 to C12, preferred C2 to C9, also preferred C7 to C12, more preferred C7 to C9 saturated or unsaturated polyhydroxyalkyl carboxylic acids, i.e. glyceric acid, 2,2-dimethylolpropane carboxylic acid, arabinonic acid, gluconic acid, glucoronic acid, glucoheptonic acid, glucopyranosyl arabinonic acid, lactobionic acid, maltobionic acid, tartaric acid, ascorbic acid, C7 to C12, preferred C7 to C9 hydroxyaromatic carboxylic acids, i.e. 2-hydroxy benzoic acid, 3-hydroxy benzoic acid, 4-hydroxy benzoic acid, 2-hydroxy cinnamic acid, 3-hydroxy cinnamic acid, 4-hydroxy cinnamic acid, C7 to C12, preferred C7 to C9 polyhydroxyaromatic carboxylic acids, i.e 2,3-dihydroxy benzoic acid, 2,4-dihydroxy benzoic acid, 2,5-dihydroxy benzoic acid, 2,6-dihydroxy benzoic acid, 3,4-dihydroxy benzoic acid, 3,5-dihydroxy benzoic acid, dihydroxy cinnamic acids or their partial esters, i.e. 3,4-dihydroxy cinnamic acid, trihydroxy benzoic acids or their partial esters, i.e. 2,3,4-trihydroxy benzoic acid, 2,3,5-trihydroxy benzoic acid, 2,3,6-trihydroxy benzoic acid, 2,4,5-trihydroxy benzoic acid, 2,4,6-trihydroxy benzoic acid, 3,4,5-trihydroxy benzoic acid, trihydroxy cinnamic acids or their partial esters, i.e. 3,4,5-dihydroxy cinnamic acid, or derived from di- and higher hydroxylated alcohols, i.e., ethylene glycol, propylene glycols, butylene glycols, hexylene glycols, glycerol, diglycerol, triglycerol, pentaerythrol, sorbitol.

In an exemplary embodiment of the invention, the silanes C) can be synthesized from epoxy functionalized silanes by reaction with the hydroxy functional carboxylic acids under formation of ester bonds in the presence of catalysts. The esterification of epoxides with carboxylic acids is prior art (US2012/0289649). Alternatively, the epoxy functionalized silanes can be reacted with the di- and higher hydroxylated alcohols under formation of ether bonds in the presence of catalysts. The etherification of epoxides with alcohols is prior art (U.S. Pat. No. 6,642,423).

The wt % ratio between A) the polyorganosiloxanes which comprise for Z with $Z^1$ and $Z^2$ substituents b) and c), and B) the silanes $(R^1X)_xR^1_{4-x}Si$ and C) the silanes $(R^1X)_xR^1_{3-x}Si$—$R^{10}$ are A):B):C)=10:80:10 to 40:20:40; 15:70:15 to 30:40:30; even 30:60:10 to 10:60:30.

Coating polymeric resin substrates such as molded articles of polycarbonate or PMMA with an antifog coating is an accepted procedure to prevent visible condensation of water droplets on the coating surface. The coating film provides a hydrophilic property to reduce the water contact angle. This is obtained by introducing hydrophilic polymer parts to the coating matrix.

Vinyl based copolymers comprising of hydrophilic and hydrophobic parts are described in US2005/0004280 which is herewith included by reference. The compositions according to patent US2005/0004280 represent multi component systems. Major disadvantage is a reduced pot life of a few hours after mixing.

Polysiloxane based antifog coatings are described in US2004/0237833. In a sol-gel process a coating material is obtained which contains hydrophilic side chains comprising polyethylene glycol or acidic groups. The coating compositions contain surfactants to increase the hydrophilic property of the coating film. This can reduce the long-term performance of the coating layer due to elution.

The compositions according to the invention circumvent the above described disadvantage. The starting materials A), B) and C) can be prepared in an efficient way. No unreactive surfactants need to be added to ensure the desired property. The pot life time is in the range of weeks which is sufficient for the intended applications for molded polycarbonate articles in automotive applications like interior coatings for headlight lamps to prevent fogging on the inside of the car headlamp.

Details on the application of antifog formulations are described in US2012/245250. Further details are illustrated by the corresponding non-limiting examples.

The invention also provides a process for forming a compound of according to the invention of the formula:

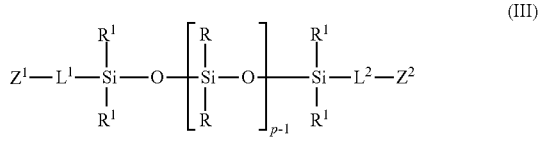

(III)

comprising the steps reacting
(i) a first compound L*-$Z^1$ with a symmetrically α,ω-terminated polyorganosiloxane of the formula Z*-L-$SiR^1_2$—O[—$SiR_2$O-]$_{p-1}$-$SiR^1_2$-L-Z*
p=1 or 4 or 9
Z*=hydrogen (in SiH), $R^{2'}$ $Z^1$ or $Z^2$
optionally in the presence of a catalyst, wherein $R^1$, $Z^1$, L, $L^1$ and $L^2$ are defined above, L* is an unsaturated C2-C20-alkenyl or a SiH group of a silane or a siloxane moiety whereby L* and Z* are forming the unit -$L^1$-$Z^1$ in a that reaction step,
ii) separating optionally by distillation the product of step i) wherein one group Z* has been reacted to form -$L^1$-$Z^1$,
iii) submitting the mono functionalized product of step ii) to a further reaction with a compound of the formula L**-$Z^2$ to form a group -$L^2$-$Z^2$, whereby
L** is an unsaturated C2-C20-alkenyl or a SiH group of, a silane or siloxane moiety, and
iv) optionally a separation step, and
v) optionally a step, wherein the group $Z^2$ is further submitted to a third reaction to form the final group $Z^{22}$ comprising saturated or unsaturated C2-C8-esters or hydrocarbon amines or ammonium groups.

An exemplary embodiment of the process for forming a compound according to the invention related to the formula:

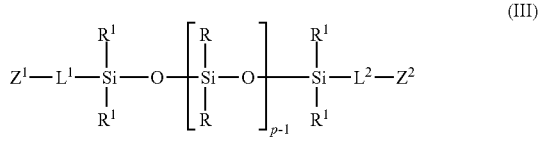

(III)

comprises the steps reacting
(i) an alkoxysilane of the formula $(R^1O)_xR^1_{3-x}$Si—H or an organofunctional disiloxane Z*-L-$R_2$Si—O—$SiR_2$H, with a dialkenyl compound of the formula:

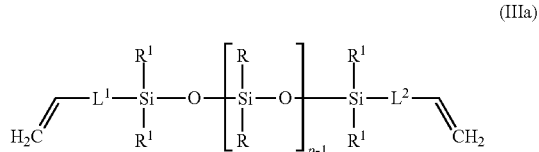

(IIIa)

p=1 or 4 or 9
in the presence of a hydrosilylation catalyst, wherein x, R, $R^1$ are defined above,
ii) separating optionally by distillation the product wherein one alkenyl group -L-Z1 has been reacted to form -$L^1$-$Z^1$, iii) submitting the mono alkenyl group functional product of step ii) to a further hydrosilylation reaction with a silane or siloxane compound having one SiH group of the formula L-$Z^2$ to form a group -$L^2$-$Z^2$, and
iv) optionally a separation step, and
v) optionally a step, wherein the group $Z^2$ is further submitted to a third reaction forming the final group $Z^{22}$ comprising unsaturated C2-C8-esters or hydrocarbon amines.

Another exemplary second alternative embodiment of the process for forming a compound according to the invention related to the formula (III):

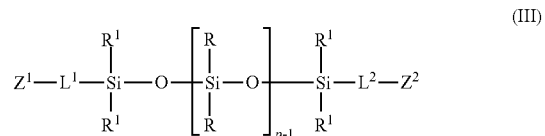

(III)

comprises the steps reacting
(i) an alkoxysilane of the formula $(R^1O)_xR^1_{3-x}$Si-L-CH=$CH_2$ or an alkenyl-functional disiloxane Z*-L-$R_2$Si—O—$SiR_2$—$R^2$, with a hydrogen siloxane of the formula:

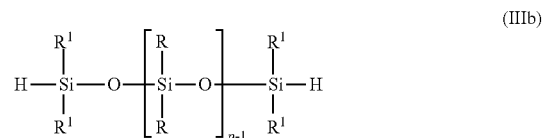

(IIIb)

p=1 or 4 or 9
in the presence of a hydrosilylation catalyst, wherein x, R, R1 are defined above,
ii) separating optionally by distillation the product wherein one SiH group has been reacted to form -$L^1$-$Z^1$,
iii) submitting the mono SiH group functional product of step ii) to a further hydrosilylation reaction with an unsaturated compound of the formula L**-$Z^2$ to form a group -$L^2$-$Z^2$, and
iv) optionally a separation step, and
v) optionally a step, wherein the group $Z^2$ is further submitted a third reaction to form the final group $Z^{22}$ comprising unsaturated C2-C8-esters or hydrocarbon amines.

The invention also provides a third exemplary embodiment of a process for forming a polyorganosiloxane wherein more than one di-, penta- or decasiloxane block is present. This polyorganosiloxane having a higher molecular weight is composed of at least 2 siloxane blocks, preferably 3 siloxane blocks, whereby all blocks have a polydispersity of <1.2 preferably close to 1 or a uniform siloxane block defined by >85 wt. preferably >90 wt. % measured by GC of one siloxane block with an index p=1 or 4 or 9. This is a unique characteristic of the inventive polyorganosiloxanes which make these polymers different to other polyorganosiloxanes state of the art linked by divalent organic groups but having a polydispersity index of more than 1.2 or a weight percentage for the individual siloxane block p=1, 4 or 9 below 85 wt. %. The inventive polyorganosiloxanes having this feature for of at least the single siloxane block in the block polymer can also be synthesized with a higher molecular weight whereby the index m in formula (I) is up to 8.

Such polyorganosiloxanes of formula (I) are synthesized by a stepwise addition reaction of symmetrically substituted and asymmetrically substituted di-, penta- or decasiloxane blocks having up to 9, more preferred 7 of these siloxane blocks linked together over divalent organic groups L. This class of polyorganosiloxanes according to the invention are forming a blockpolymer of the formula (I), wherein the index m is >1.

The invention includes also a process for forming such a blockpolymer of the formula (I)

$$Z-\{-L[SiR_2O]_p—SiR_2\}_m-L-Z \quad (I)$$

wherein
L, Z is as defined before
R is selected from R and $R^1$,
p=1 or 4 or 9
m=3 to 7,
whereby the process comprising the steps reacting
a1) first symmetrically substituted compound $Z^*$-L-[SiR$_2$O]—SiR$_2$-L-$Z^*$ with 2 moles of a α,ω-terminated polyorganosiloxane of the formula $$Z^{**}-L-[SiR^*_2O]_p—SiR^*_2-L-Z^{**}$$

$Z^*$=hydrogen, (SiH), alkenyl, OH-, Cl- or Br-alkyl, epoxy, amine, —NCO
$Z^{**}$ selected from =$Z^*$ and $Z^1$ and $Z^2$ which can complementarily react with each other optionally in the presence of a catalyst, wherein p=1 or 4 or 9;
R, $R^1$, L, $L^1$, $L^2$ are defined above, $R^*$ is R or $R^1$, each of them can be different,
wherein $Z^*$ and $Z^{**}$ in step a1) are forming a unit -$L^3$-, such as
$Z^{**}$-L-[SiR$^*_2$O]$_p$—SiR$^*_2$-$L^3$-[SiR$_2$O]$_p$—SiR$_2$-$L^3$-[SiR$^*_2$O]$_p$—SiR$^*_2$-L-$Z^{**}$
a2) separating optionally by distillation the product of step a1) wherein two groups $Z^*$ and $Z^{**}$ have been reacted to form two units -$L^3$- and a molecule with 3 siloxane blocks —[SiR$_2$O]$_p$,
a3) optionally repeating step a1) and a2), optionally separating the by-product of step a2),
submitting the di-functionalized symmetrically substituted product of step a2) to a further reaction with 1 or 2 mol of a compound of the formula $Z^*$-L-SiR$^{}_2$—O—[R$_2$Si—O—]$_{p-1}$—SiR$^{}_2$-L-$Z^*$ to form a molecule with 4 or 5 siloxy blocks and a step
a4) wherein the symmetrically substituted reaction product of step a2) or a3) is submitted to a third reaction between moieties comprising groups $Z^*$ and $Z^{}$ to form a linking unit L4 and a final product having 6 or 7 siloxy blocks wherein $Z^1$ and $Z^2$ are different forming an asymmetrically substituted polyorganosiloxane, separating optionally by distillation the by-product of step a4) to result $Z^1$-$L^1$-[SiR$^{}_2$O]$_p$—SiR$^{**}_2$-{-L[SiR$_2$O]$_p$—SiR$_2$}$_{m-1}$-$L^2$-$Z^2$ L=$L^3$ or $L^4$
m=4

$Z^1$-L-[SiR$^{}_2$O]$_p$—SiR$^{}_2${-L[SiR$_2$O]$_p$—SiR$_2$}$_{m-2}$-L-[SiR$^{}_2$O]$_p$—SiR$^{}_2$-L-$Z^2$

L=$L^3$ or $L^4$
m=5
p=1 or 4 or 9
$Z^1$ and $Z^2$ are as defined above and are different.

The optionally applicable separation steps may include distillation, crystallization and solid phase chromatography. Although the preferred used hydrosilylation reaction for the stepwise addition of the siloxane blocks results in high yields of the desired addition products, it is preferred to separate the unused precursors by distillation, if possible by crystallization. The desired addition products at least the intermediates with up to 5 at least up to 3 di-, penta- or deca-siloxane blocks can be purified by distillation.

In different to usual polyorganosiloxanes having a higher/broader polydispersity index such a purification step can be applied to the monomodal polyorganosiloxane precursors of invention and provides very well defined siloxane block structures with distinct blocks having an index p=1, 4, or 9 for more than 85 wt. %.

The preferred addition reaction for the insertion of two different terminal group which result in asymmetrically terminal substituted polyorganosiloxane can be applied on any symmetrically substituted polysiloxane precursor at any stage, i.e. a mono block or polyblock polymer/copolymer, as final reaction step in order to make this polymer asymmetrically substituted in the terminal position.

A particular preferred suitable route for the incorporation of alkoxysilyl groups and olefinic groups into the polyorganosiloxane compound is the addition of alkoxysilanes of the structure $(R^1O)_xR_{3-x}Si$—H, wherein x is 1-3, in an amount of less than 1 mol/1 mol dialkenylpentasiloxane of formula (IIIa) in the presence of a hydrosilylation catalyst yielding the target derivatives of the structure:

$$(R^1O)_xR_{3-x}Si—CH_2CH_2—SiR_2—O-[D]_3—SiR_2-L-CH=CH_2.$$

In a typically reaction regime, the molar ratio of the alkenyl groups of the dialkenyl disiloxane or pentasiloxane or decasiloxane to the SiH groups is between 1.5:1 to about 5:1. In one preferred embodiment, R is selected from methyl and phenyl, D=$R_2$SiO, $R^1$ is preferably C1-C8 alkyl, whereby x is 3. Typically, the excess of the silane and the dialkenyl di- or pentaorganosiloxanes can be removed by distillation. In some cases if distillation or crystallization is not suitably or possible, the excess of the precursor disiloxane or pentasiloxane can be removed after the application and fixation on solid surfaces by repeated washes with organic solvents.

In another preferred embodiment of the invention the above described product of the formula $(R^1O)_xR_{3-x}Si—CH_2CH_2—SiR_2—O-[D]_3—SiR_2-L-CH=CH_2$ is further reacted with a silane or a siloxane compounds $L^*$-Z having one SiH-group and a second reactive group which e.g. is an epoxy group, for example of formula (VI), in the presence of a hydrosilylation catalyst.

It is within the scope of the invention to change the order of the addition steps for the compounds $L^*$-Z. For example, it is possible to react the divinyl di- or organopenta-, organodecasiloxane compound with the compound of the type SiH-epoxy first and then afterwards with a silane of the structure $(R^1O)_xR_{3-x}Si$—H wherein x is 1-3.

Alternatively, the alkoxysilyl groups and olefinic groups containing derivatives according to the invention can be synthesized in a two-step sequence starting from a SiH-precursor according to formulas (IIIa) or (IIIb)

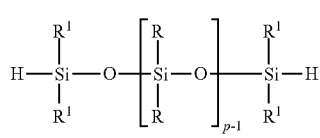
(IIIb)

p=1 or 4 or 8.

A molar excess of the SiH functionalized pentasiloxane is reacted with an unsaturated silane, e.g., having the structure $(R^1O)_xR_{3-x}Si-CH=CH_2$ wherein x is 1-3 in the presence of a hydrosilylation catalyst. Typically, the molar excess of the SiH-siloxane (IV) or (IVa) over the vinyl silane ranges from a molar ratio of SiH:alkenyl groups between 1.5:1 to 5:1. The groups R and $R^1$ are as defined before. A preferred group R is methyl or phenyl, and x is 3. Typically, the excess of the SiH precursor according to formula (IIIb) can be removed by distillation.

In a second hydrosilylation step the intermediate of the formula $$(R^1O)_xR_{3-x}Si-CH_2CH_2-SiR_2-O-[D]_3-SiR_2-H$$

having the desired first reactive group is reacted with a compounds comprising at least one unsaturated group to yield the desired final asymmetric polyorganosiloxane. Examples of suitable groups for the second addition reaction include, but are not limited to this enumeration, bis-olefinic compounds, 1,5-hexadiene, norbornadiene, 5-ethylidene-2-norborene, limonene, exo-dicyclopentadiene, ethylene glycol diallyl ether, propylene glycol diallyl ether, divinyl-tetramethyldisiloxane, etc.; acetylenic-olefinic, e.g., propargylic alcohol-undecylenic acid ester, etc., acetylenic-bis-olefinic, etc.; 1,4-butynediole-bis(undecylenic acid) ester, and bis-acetylenic, e.g., bis-propargyl ether.

The molar excess of the bis-unsaturated compound depends on its structure. Typically, for reactions with bis-olefinic and bis-acetylenic compounds a molar excess of silane and of bis-olefin over SiH of the first intermediate compound ranging from 1.5:1 to 5:1 of bis-olefin or bis-alkyne/acetylene to SiH of the SiH intermediate. The excess of the bis-olefinic compound can be removed by distillation. Typically, for compounds of the types acetylenic-olefinic and acetylenic-bis-olefinic to apply a molar excess of the unsaturated compounds over SiH ranging from unsaturated compound to SiH of 1:1 to 1.1:1. Typically, a minor excess of the acetylenic-olefinic or acetylenic-bis-olefinic compound can remain in the final material.

In another embodiment, the above described SiH-intermediate compound $(R^1O)_xR_{3-x}Si-CH_2CH_2-SiR_2-O-[D]_3-SiR_2-H$ is used for the synthesis of a compound comprising alkoxy silyl groups and epoxy groups as terminal groups of a di- or a organopentasiloxane wherein more than 80 wt. % have a siloxy chain length of 2 or 5. The SiH-intermediate can be reacted with compounds L*-Z such as, for example, olefinic-epoxy, e.g., allyl glycidyl ether, 4-vinyl cyclohexeneoxide, limonene epoxide, norbornadiene monoepoxide, dicyclopentdienyl monoepoxide, monoepoxypolyethers, etc., or acetylenic-epoxy, e.g., propargyl glycidyl ether, 1,4-butynediol-di-glycidylether, etc. to yield target molecules having alkoxysilyl and unsaturated groups.

In a third embodiment of the invention polyorganosiloxanes can be synthesized wherein the terminal groups are on one side selected from di- or trihydroxyaromatic substituents and at the other end from olefinic groups. The symmetric alpha, omega-dihydrogen pentasiloxane of formula (IIIb) is one suitable precursor again.

In such a reaction a molar excess of the SiH-functionalized pentasiloxane is reacted with unsaturated di- or trihydroxyaromatic precursors, their alkyl or silyl ethers, i.e. 1-allyl-3.4-dihydroxy benzene, 1-allyl-3-methoxy 4-hydroxy benzene, the bis-alkoxysilylethers of 1-allyl-3.4-dihydroxy benzene in the presence of a hydrosilylation catalyst. Typically, the molar excess of the SiH-siloxane over the unsaturated group in the aromatic precursor ranges from SiH-siloxane to unsaturated aromatic precursor from 1.5:1 to 5:1. Typically, the excess of the SiH-precursor according to formula (IV) can be removed by distillation.

In a second hydrosilylation step the SiH— intermediate of the formula $$Z^1\text{-L-SiR}_2-O-[D]_3-SiR_2-H;$$

$Z^1$=aromatic moiety is reacted with compounds having the desired second reactive group to yield the desired final polyorganosiloxane compound. Examples of suitable groups include, but are not limited to it are bis-olefinic compounds, 1,5-hexadiene, norbornadiene, 5-ethylidene-2-norborene, limonene, exo-dicyclopentadiene, ethylene glycol diallyl ether, propylene glycol diallyl ether, divinyl-tetramethyldisiloxane, etc.; acetylenic-olefinic, e.g., propargylic alcohol-undecylenic acid ester, etc., acetylenic-bis-olefinic, etc.; 1,4-butynediole-bis(undecylenic acid) ester, and bis-acetylenic, e.g., bis-propargyl ether. The suitable molar excess of the bis-unsaturated compound depends on its structure. Typically, for the reaction with bis-olefinic and bis-acetylenic compounds is a molar excess of bis-olefin over SiH ranging from bis-olefin/acetylene to SiH of 1.5:1 to 5:1 is applied. The excess of the bis-olefinic compound can be removed by distillation. Typically, for compounds of the types acetylenic-olefinic and acetylenic-bis-olefinic a molar excess of the unsaturated compounds over SiH groups ranging from unsaturated compound to SiH of 1:1 to 1.1:1 is applied. Typically, a minor excess of the acetylenic-olefinic or acetylenic-bis-olefinic compound can remain in the final material.

In a fourth embodiment of the invention the polyorganosiloxanes can be synthesized in a two-step wherein the terminal groups are on one side di- or trihydroxyaromatic substituents and at the other end epoxy groups starting from the aforementioned SiH-precursor wherein the first step comprises the synthesis of the intermediate of the third embodiment of the formula $Z^1$-L-SiR$_2$—O-[D]$_3$—SiR$_2$—H; $Z^1$=aromatic moiety, which is reacted in the second step with a suitable olefinic-epoxy compounds, e.g. allyl glycidyl ether, 4-vinylcyclohexeneoxide, norbornadiene monoepoxide, limonene epoxide, dicyclopentdienyl monoepoxide, or the monoaddition product of allyl glycidyl ether to tetramethyl dihydrogendisiloxane (IV), etc., or acetylenic-epoxy, e.g., propargyl glycidyl ether, 1,4-butynediol-di-glycidylether, etc. to yield the target molecules having di- or trihydroxyaromatic and epoxy groups.

It is in the scope of the invention to combine a difunctional tetraorganodisiloxane with a hexaorganocyclotrisiloxane wherein each of the precursor siloxane has different substituents R, $R^1$ selected from R.

For example, without being exhaustive it is preferred to use the following pentasiloxanes as precursor for the asymmetrically substituted polyorganosiloxanes of the invention. Suitable examples include, but are not limited to:

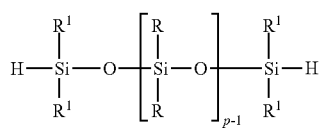

R, $R^1$=methyl, phenyl, styryl, phenylpropyl, naphthyl,

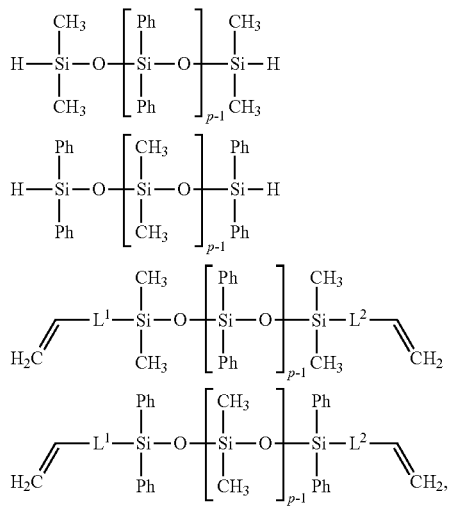

wherein $L^1=L^2$ are as defined above.

The various moieties of the inventive polyorganosiloxanes can be synthesized according to any suitable process in which SiH or Si-alkenyl can be linked with compounds L*-Z having additional reactive groups. Primary and secondary amino groups containing derivatives can be synthesized by different synthesis routes. In one embodiment the terminal epoxy group of an inventive pentaorganosiloxane is reacted with a primary amine to create a terminal group $Z^{22}$, which is a secondary, tertiary amino or quaternary ammonium group. Suitable amines are, e.g., propylamine, diprimary amines, e.g., ethylene diamine (DE 4318536) and primary-secondary diamines, e.g., hydroxyethylenediamine. In another embodiment the precursor has a halogenalkyl group instead of an epoxy group and is reacted with the aforementioned amines. Tertiary amino and quaternary ammonium groups containing derivatives can be synthesized from the inventive pentaorganosiloxane having terminal epoxy groups and secondary amines, secondary-tertiary diamines (WO 02-10257), or tertiary amines, e.g., trimethylamine or dimethyl-long chained alkyl amines (U.S. Pat. No. 4,891,166), respectively.

Polyorganosiloxanes comprising a group of a Bunte salt can be synthesized from the inventive di- and pentaorganosiloxane having terminal epoxy groups and thiosulfate (Silicone, Chemie und Technologies, Vulkan Verlag Essen 1989, S. 121).

Phosphonium groups containing derivatives can be synthesized from the inventive polyorganosiloxane having terminal epoxy groups and trialkyl- or triarylphosphines.

Terminal carbonate groups are inserted via hydrosilylation addition reaction of unsaturated carbonate compounds to a SiH functionalized siloxane precursor having alkoxysilyl as first terminal group, whereby the carbonate is e.g., allyl carbonate (U.S. Pat. Nos. 5,672,338, 5,686,547). Alternatively, epoxy precursors can be reacted with $CO_2$ yielding the carbonates (DE 19505892), or amino precursors are reacted with bifunctional carbonate coupling agents (WO 2005/058863).

Polyorganosiloxanes having terminal isocyanato groups containing derivatives can be synthesized for example starting from amino precursors and di- or higher functional isocyanates. Alternatively, carbamato functionalized precursors can be subjected a pyrolysis reaction.

The aforementioned reaction products of epoxy precursors with di-primary amines show after reaction secondary or tertiary amino groups as well as secondary hydroxyl groups. Subsequent reactions of these functional groups with isocyanates yield compounds which contain urea and urethane moieties (Organikum, VEB Deutscher Verlag der Wissenschaften 1988, 17. Auflage, S 429).

Another kind of urethane modified derivatives can be synthesized from carbonate precursors with amines (U.S. Pat. No. 5,672,338) or amino precursors with cyclocarbonates.

Compounds containing amide groups are available by reaction the inventive polyorganosiloxane having terminal primary amine groups providing precursors to form lactones (DE 4318536).

Polyorganosiloxanes comprising enamine groups are available by a reaction of the amino precursors with aldehydes or ketones (WO 2008-113820).

The insertion of aldehyde groups can be carried by a reaction of amino precursors with dialdehydes, e.g., glyoxal or by reaction of epoxy precursors with carboxylic acid functions containing aldehydes, e.g., glyoxylic acid (U.S. Pat. No. 5,093,518).

Carbobetaines can be synthesized from tertiary amino groups containing precursors and Na chloroacetate (Silicone, Chemie und Technologies, Vulkan Verlag Essen 1989, S. 121). Alternatively, epoxy precursors can be reacted with amino acids (DE 10036532).

Sulfobetaines can be synthesized from tertiary amino groups containing precursors and sultones (DE 4140447). Alternatively, epoxy precursors can be reacted with amino sulfonic acids, i.e. taurine.

Polyorganosiloxanes comprising carboxylic acid moieties can be synthesized i.e. from hydroxyl, epoxide or amino functionalized precursors and carboxylic acid anhydrides, i.e. phthalic acid anhydride, succinic anhydride, maleic anhydride (DE 4318539). Alternatively, epoxy precursors can be reacted with e.g. dicarboxylic acids, i.e. phthalic acid, succinic acid, maleic acid.

Sulfonic acid derivatives can be synthesized starting from the epoxy precursors and $NaHSO_3$ (Silicone, Chemie und Technologies, Vulkan Verlag Essen 1989, S. 121).

Sulfate derivatives can be synthesized using hydroxy groups containing precursors and amido sulfonic acid $NH_2S(O)_2OH$ (DE 4318539).

The incorporation of phosphate or phosphoric acid moieties is described, for example, in U.S. Pat. Nos. 5,859,161 and 6,175,028.

Phosphonic acid ester and phosphonate moieties can be incorporated by reaction of olefinically unsaturated precursors with esters of the phosphonic acid $HP(O)(OH)_2$.

Xanthogenate and xanthogenate ester moieties containing derivatives can be synthesized from the epoxy precursors in the presence of KOH and $CS_2$.

The asymmetrically substituted polyorganosiloxane compounds of the invention can be used for the modification of inorganic and organic solid surfaces. Examples of inorganic surfaces include, but are not limited to glass, metal oxide/ hydroxides and ceramics. Examples of organic materials include, but are not limited to, surfaces based on epoxy resins and coating, polyamides, silicone resins, polybutadiene, and polyurethane coatings etc.

The asymmetrically substituted polyorganosiloxane, compounds can also be used for the modification of inorganic and organic micro and nanoparticles. Examples of inorganic micro and nanoparticles including nano crystallites comprise, but are not limited, to nanoparticles based of $Al_2O_3$, $SiO_2$, $TiO_2$, $ZrO_2$, $HfO_2$, ZnO, rare earth metal oxides and their mixtures, alumosilicates, e.g., bentonite, montmorillonite, laponites, etc.

The invention includes also a method for dispersing inorganic particles or compatibilizing two or more non-miscible liquid phases wherein at least one asymmetric polyorganosiloxane according to the invention is used.

One preferred embodiment comprises compositions wherein the asymmetrically substituted polyorganosiloxane compounds are used to compatibilize or disperse the optionally modified inorganic and organic micro and nanoparticles with organic liquids. Examples of organic liquids, include, but are not limited to, silicone polymers, esters, ethers, amides, amines, alcohols, and mixtures of two or more thereof. These liquids may comprise curable polymers which can serve as matrix or binder polymer for the nano particles. The term nano particles used in this invention is defining particles which have a particle size below 200 nm, preferably below 50 nm, more preferably below 10 nm.

In one embodiment, the surface modified inorganic or organic micro or nanoparticles react with portions of the polyorganosiloxane of the invention. Such modified nanoparticles can further strengthen the interaction with any matrix or is blocking agglomeration of the particles. The term compatibilizer shall include also the use of the asymmetrically substituted polyorganosiloxanes for dispersing nano particle or the adjustment of differences in the refractive index between a polyorganosiloxane having refractive index of >1.43 and the nano sized metal oxides having higher refractive indices of >1.6, in particular crystalline metal oxide particles like $TiO_2$, $ZrO_2$, ZnO, $HfO_2$ and the like dispersed in polyorganosiloxane.

In another preferred embodiment comprising compositions of more than one polymer, the asymmetrically substituted polyorganosiloxanes can be used as compatibilizers at the interphases between different polymers or surfaces. An exemplary application is the use in primer composition, adhesion promoter in self-adherent rubbers in particular silicone rubbers or thermoplastic compositions and coatings. Examples include, but are not limited to, polymer combinations based on silicones with epoxy resins, polyamides, polybutadienes, etc., self-adherent silicone or other organic rubbers.

A more specific preferred embodiment is the use of the asymmetric polyorganosiloxanes of the invention as antifouling agent. Such surfaces are repellant against the adhesion of biofilms can be manufactured either by the use of the inventive polyorganosiloxanes exclusively optionally by application of an additional curing step or as part of a polyorganosiloxane composition whereby this composition can be cured by any of the jointly acceptable system immanent curing mechanism accessible by the reactive groups of the inventive polyorganosiloxane. The preferred reactive groups of the inventive polyorganosiloxanes as anti-fouling coat comprise alkoxysilyl, epoxy, alkenyl, ammonium, and alkyl or OH- or alkyl-terminated polyether groups.

The inventive polyorganosiloxanes can comprise R, $R^1$ or L-Z groups having higher optical density. The insertion of such substituents R or Z groups can increase the refractive index up to >1.55. Suitable groups for higher refractive indices are aromatic, bicycloaliphatic, epoxidized bicycloaliphatic or aliphatic epoxy groups. Since at least a second reactive group in the inventive polyorganosiloxanes is ready for a cure reaction such composition are useful for the manufacture of optical devices and coatings wherein a higher refractive index is desired as well as the temperature resistance of polyorganosiloxanes.

The invention also includes cured compositions comprising at least one polyorganosiloxane of the invention for the use in coating compositions, rubber compositions and useful in the manufacture of optical devices. The applicable curing reactions may comprise radical initiated reactions e.g. by heat or light activated peroxides, other initiators or light and a heat or light activated hydrosilylation of unsaturated groups with SiH groups, condensation and reactions of the SN-type, such as oxiranyl ring-opening reactions with amines or light activated cationic polymerization with onium and sensitizer compounds for the transfer of light energy.

EXAMPLES

Example 1. Synthesis of the Monomodal SiH Pentasiloxane H—$SiMe_2$-O-$[D]_3$—$SiMe_2$-H 22.2 g (0.3 mol MeSiO of hexamethylcyclotrisiloxane ($D_3$) and 13.4 g (0.10 mol) tetramethyldisiloxane $^HM$-$M^H$ were solved in 22.2 g tetrahydrofuran (THF) and 1.3 g of an acidic ionic exchanger resin Amberlyst A15 as catalyst were admixed. After 3 hrs at 60° C. the ring-opening reaction was found to be completed. The $D_3$ was converted to more than 90 wt. % to alpha, omega-dihydrogendecamethylpentasiloxane indicated by gas chromatography (GC).

The pentasiloxane $^HM$-$D_3$-$M^H$ was filtered over an EKS-filter and purified in a fractional distillation (product fraction: 55-65° C. and <7 mbar). A purity of 90 wt. % was achieved confirmed by gas chromatography.

$^1$H-NMR (400 MHz, $CDCl_3$, 25° C.) δ [ppm]=0.09 (m, 18H; $CH_3$), 0.20 (m, 12H; $CH_3$), 4.73 (sept, J(H, H)=2.8 Hz, 2H; SiH).

$^{29}$Si-NMR (79 MHz, $CDCl_3$, 25° C.) δ [ppm]=−21.96 (1Si; Si($CH_3$)$_2$), −20.13 (2Si; Si($CH_3$)$_2$), −7.13 (2Si; Si($CH_3$)$_2$).

Example 2. Synthesis of Butyl and SiH Functionalized Pentasiloxane $CH_3(CH_2)_3$—$SiMe_2$-O-$[D]_3$—$SiMe_2$-H 1-Butene gas (600.0 g, 10.70 mol) was slowly added at 80° C. to a degassed mixture of monomodal pentasiloxane $M^H$-$D_3$-$M^H$ of example 1 (740.0 g, 2.10 mol) and a Lamoreaux-Pt catalyst solution (10 ppm, as 3.3 wt. % Pt solution in octanol). After completion of the gas addition, the reaction was further heated at 100° C. for 30 min. The crude product was purified in vacuo resulting in 440.1 g (51.0% yield related to the used pentasiloxane) of neat product $CH_3(CH_2)_3$—$SiMe_2$-O-$[D]_3$—$SiMe_2$-H. The product was used for subsequent reaction steps without further characterizations.

$^1$H-NMR (400 MHz, $CDCl_3$, 25° C.) δ [ppm]=0.16 (m, 30H; $CH_3$), 0.57 (m, 2H; $CH_2$), 0.91 (t, J(H, H)=7.1 Hz, 3H; $CH_3$), 1.34 (m, 4H; $CH_2$), 4.75 (sept, J(H, H)=2.8 Hz, 1H; SiH).

Example 3. Synthesis of Butyl and Alkoxysilyl Functionalized Pentasiloxane CH$_3$(CH$_2$)$_3$—SiMe$_2$-O-[D]$_3$—SiMe$_2$-CH$_2$CH$_2$—Si(OMe)$_3$ A mixture of the product of example 2 CH$_3$(CH$_2$)$_3$—SiMe$_2$-O-[D]$_3$—SiMe$_2$-H (111.5 g, 0.30 mol) and trimethoxyvinylsilane (159.2 g, 1.10 mol) was heated to 90° C. followed by the addition of a Lamoreaux-Pt catalyst solution (10 ppm, as 3.3 wt. % Pt solution in octanol). The mixture was kept at a temperature of 130° C. by slowly adding CH$_3$CH$_2$CH$_2$CH$_2$—SiMe$_2$-O-[D]$_3$—SiMe$_2$-H (229.3 g, 0.60 mol). Subsequently, the reaction mixture was heated at 130° C. for 1 hr to complete the hydrosilylation reaction. Volatiles were removed in vacuo (<20 mbar, 150° C.) leading to 412.5 g (89.1% yield with regard to the used pentasiloxane starting material) of a pale-yellow liquid as the product.

$^1$H-NMR (400 MHz, CDCl3, 25° C.) δ [ppm]=0.06 (m, 30H; CH$_3$), 0.55 (m, 5H; CH$_2$), 0.88 (t, J(H, H)=7.04 Hz, 3H; CH$_3$), 1.31 (m, 4H; CH$_2$), 3.57 (s, 9H; OCH$_3$).

$^{29}$Si-NMR (79 MHz, CDCl$_3$, 25° C.) δ [ppm]=−41.52 (1Si; Si(OCH$_3$)$_3$), −22.29 (1Si; Si(CH$_3$)$_2$), −21.75 (1Si; Si(CH$_3$)$_2$), −21.51 (1Si; Si(CH$_3$)$_2$), 7.59 (1Si; Si(CH$_3$)$_2$CH$_2$), 8.02 (1Si; Si(CH$_3$)$_2$CH$_2$).

Example 4 Synthesis of an Alkoxysilyl and SiH Functionalized Pentasiloxane (MeO)$_3$Si—CH$_2$CH$_2$—SiMe$_2$-O-[D]$_3$—SiMe$_2$-H Trimethoxyvinyl silane (112.9 g, 0.76 mol) was added dropwise at 90° C. to a vigorously stirred mixture of the monomodal pentasiloxane M$^H$-D$_3$-M$^H$ of example 1 (269.2 g, 0.75 mol) followed by the addition of a Lamoreaux-Pt catalyst (10 ppm, as 3.3% Pt solution in octanol) under an N$_2$ atmosphere. After completion of the hydrosilylation reaction the mixture was kept at 130° C. for 1 h. The crude product was distilled (130° C., 6 mbar) yielding the neat target molecule (158.0 g, 41.0% yield calculated with respect to the used pentasiloxane, purity >99.0% determined by GC).

$^1$H-NMR (400 MHz, CDCl$_3$, 25° C.) δ [ppm]=0.06 (m, 30H; CH$_3$), 0.55 (m, 6H; CH$_2$), 0.88 (t, J(H, H)=7.0 Hz, 3H; CH$_3$), 1.31 (m, 4H; CH$_2$), 3.57 (s, 9H; OCH$_3$).

$^{29}$Si-NMR (79 MHz, CDCl$_3$, 25° C.) δ [ppm]=−42.70 (1Si; Si(OCH$_3$)$_3$), −22.98 (1Si; Si(CH$_3$)$_2$), −22.45 (1Si; Si(CH$_3$)$_2$), −20.97 (1Si; Si(CH$_3$)$_2$), −7.93 (1Si; Si(CH$_3$)$_2$H), 7.17 (1Si; Si(CH$_3$)$_2$CH$_2$).

Example 5. Synthesis of an Alkoxysilyl and Epoxy Functionalized Pentasiloxane (MeO)$_3$Si—CH$_2$CH$_2$—SiMe$_2$-O-[D]$_3$—SiMe$_2$-(CH$_2$)$_3$—O—C$_3$H$_5$O (—C$_3$H$_5$O=glycidyl/propenoxide)

Allyl glycidyl ether (AGE) (5.2 g, 50.9 mmol) and a solution of Lamoreaux catalyst (10 ppm, as octanol solution containing 3.3 wt. % Pt) was mixed and heated to 90° C. Subsequently, the compound (MeO)$_3$Si—CH$_2$CH$_2$—SiMe$_2$-O-[D]$_3$—SiMe$_2$-H (20.0 g, 39.0 mmol) of example 4 was added slowly to the reaction mixture. After the completion of the addition, the mixture was heated for 1 hr at 130° C. for the completion of the hydrosilylation reaction. Purification was achieved by removing the excess of allyl glycidyl ether in vacuo (<1 mbar, 150° C.). The product was received as pale yellow liquid (19.9 g, yield 82.0%).

$^{29}$Si-NMR (79 MHz, CDCl$_3$, 25° C.) δ [ppm]=−42.53 (1Si; Si(OCH$_3$)$_3$), −23.11 (1Si; Si(CH$_3$)$_2$), −22.40 (2Si; Si(CH$_3$)$_2$), 6.78 (1Si; SiCH$_2$), 7.20 (1Si; SiCH$_2$).

Example 6. Synthesis of an Alkoxysilyl and Polyether Functionalized Pentasiloxane (MeO)$_3$Si—CH$_2$CH$_2$—SiMe$_2$-O-[D]$_3$—SiMe$_2$-(CH$_2$)$_3$—O—(CH$_2$CH$_2$)$_n$—OH (n=10)

A mixture consisting of Breox AA 450H [Cognis] (101.8 g, 0.20 mol) and the product of example 4 (MeO)$_3$Si—CH$_2$CH$_2$—SiMe$_2$-O-[D]$_3$—SiMe$_2$-H (33.9 g, 0.07 mol) was heated under an N$_2$ atmosphere to 90° C. followed by the addition of 10 ppm Pt (Lamoreaux catalyst 3.3 wt. % Pt solution in octanol). Additional (MeO)$_3$Si—CH$_2$CH$_2$—SiMe$_2$-O-[D]$_3$—SiMe$_2$-H (44.2 g, 0.09 mol) was added to the solution over a period of 10 min. Thereafter, the reaction mixture was maintained at 120° C. for 2 hrs. Volatiles were removed by vacuum distillation (<20 mbar, 100° C.) for 1 hr. The product was received in the form of a pale-yellow liquid (171.0 g, 95.0%).

$^{29}$Si-NMR (79 MHz, CDCl$_3$, 25° C.) δ [ppm]=−42.55 (1Si; Si(OCH$_3$)$_3$), −23.14 (1Si; Si(CH$_3$)$_2$), −22.42 (2Si; Si(CH$_3$)$_2$), 6.79 (1Si; SiCH$_2$), 7.15 (1Si; SiCH$_2$).

Example 7. Synthesis of an Acid Ester and SiH Functionalized Pentasiloxane (R$^1$)(R$^1$)(CH$_3$)CC(O)O—CH$_2$CH$_2$—SiMe$_2$-O-[D]$_3$—SiMe$_2$-H (R$^1$, R$^2$=Alkyl Chains, in Total 6 Carbon Atoms)

VeoVa 9 [Hexion] (31.0 g) was added dropwise at 80° C. to a vigorously stirred mixture of the monomodal pentasiloxane M$^H$-D$_3$-M$^H$ of example 1 (300.0 g, 0.84 mol) and Lamoreaux-Pt catalyst (10 ppm, as 3.3 wt. % Pt solution in octanol) under an N$_2$ atmosphere. After completion of the addition, the mixture was kept at 120° C. for 20 hrs. The excess of M$^H$-D$_3$-M$^H$ was removed in vacuo (130° C., <1 mbar) yielding in 113.0 g of an intermediate product, which was further used in a sequent reaction step without further characterization.

The intermediate product (113.0 g), vinyltrimethoxysilane (31.0 g, 0.21 mol) and a solution of Lamoreaux-Pt catalyst (10 ppm, as 3.3 wt. % Pt solution in octanol) was heated for 4 hrs at 90° C. under an N$_2$ atmosphere. Subsequently, volatile components were removed in vacuo (65° C., <1 mbar). The neat product was obtained as a brownish fluid (139.0 g, 97.0% yield related to the amount of used starting materials).

Example 8. Synthesis of an Alkoxysilyl and Vinyl Functionalized Pentasiloxane (MeO)$_3$Si—CH$_2$CH$_2$—SiMe$_2$-O-[D]$_3$-SiMe$_2$-CH$_2$CH$_2$—SiMe$_2$-O—SiMe$_2$-CH=CH$_2$ 1,1,3,3-tetramethyl-1,3-divinyldisiloxane (111.9 g, 0.72 mol) was heated under an N$_2$ atmosphere to 110° C. followed by the addition of 10 ppm Pt (Lamoreaux catalyst, 3.3% Pt in xylene solution). Then the compound of example 4 (MeO)$_3$Si—CH$_2$CH$_2$—SiMe$_2$-O-[D]$_3$-SiMe$_2$-H (50.9 g, 0.10 mol) was slowly dropped to the solution within 5 min. After the completion of the addition, the reaction mixture was maintained at 140° C. for 3 hrs. The excess of 1,1,3,3-tetramethyl-1,3-divinyldisiloxane was removed by distillation (<6 mbar, 150° C.) yielding a slightly yellow liquid product (63.5 g, 92.0% yield related to the amount of used pentasiloxane material).

Example 9. Synthesis of Allyl Glycidyl and SiH Functionalized Pentasiloxane $OC_3H_5$—O—$(CH_2)_3$—$SiMe_2$-O-$[D]_3$—$SiMe_2$-H
($OC_3H_5$=Glycidyl/Propenoxide)

$M^H$-$D_3$-$M^H$ (151.7 g, 0.43 mol) was heated to 90° C. under a nitrogen atmosphere. Lamoreaux catalyst (10 ppm, as 3.3 wt. % Pt solution in octanol) was added followed by the slow addition of allyl glycidyl ether (46.1 g, 0.40 mol). The reaction mixture was heated to 130° C. and stirred at this temperature for 1 hr. The reaction mixture was subjected to vacuum distillation (<6 mbar) and product (88.5 g, 47.0% yield calculated with respect to the used epoxide) was collected at a distillate temperature of 127-142° C. as a colorless liquid.

$^1$H-NMR (400 MHz, CDCl$_3$, 25° C.) δ [ppm]=0.04 (br, 6H; CH$_3$), 0.06 (br, 6H; CH$_3$), 0.06 (br, 6H; CH$_3$), 0.08 (br, 6H; CH$_3$), 0.17 (br, 3H; CH$_3$), 0.18 (br, 3H; CH$_3$), 0.52 (m, 2H; CH$_2$), 1.60 (m, 2H; CH$_2$), 2.58 (dd, 1H; J(H, H)=5.1, 2.7 Hz; CH$_2$), 2.77 (dd, 1H; J(H, H)=5.1, 4.2 Hz; CH$_2$), 3.12 (m, 1H; CH), 3.42 (m, 3H; CH$_2$), 3.67 (dd, 1H; J(H, H)=11.7, 3.2 Hz; CH$_2$), 4.68 (sept, 1H; J(H, H)=2.8 Hz; SiH).

Example 10. Synthesis of Glycidylether and Alkane Modified Pentasiloxane $OC_3H_5$—O—$(CH_2)_3$—$SiMe_2$-O-$[D]_3$—$SiMe_2$-$(CH_2)_{11}CH_3$ ($OC_3H_5$=Glycidyl/Propenoxide)

1-Dodecene (22.7 g, 0.14 mol) and the reaction product of example 9 $OC_3H_5$—O—$(CH_2)_3$—$SiMe_2$-O-$[D]_3$—$SiMe_2$-H (8.4 g, 0.02 mol) were heated to 90° C. upon the addition of Lamoreaux-Pt catalyst solution (10 ppm, as 3.3 wt. % Pt solution in octanol). After the initiation of the reaction, additional $OC_3H_5$—O—$(CH_2)_3$—$SiMe_2$-O-$[D]_3$—$SiMe_2$-H (40.6 g, 0.09 mol) was slowly dropped to the reaction mixture. After completion of the addition, the reaction mixture was heated at 120° C. for 1 hr. A yellow liquid was received as product and used further without purification. Full conversion was indicated through the absence of a Si-signal in the $^{29}$Si NMR spectrum that would correspond to a SiH unit (to be expected at around—7.00 ppm as observable in the pentasiloxane $^{29}$Si-NMR spectrum).

$^{29}$Si-NMR (79 MHz, CDCl$_3$, 25° C.) δ [ppm]=−23.27 (1Si; Si(CH$_3$)$_2$), −22.72 (1Si; Si(CH$_3$)$_2$), −22.44 (1Si; Si(CH$_3$)$_2$), 6.64 (1Si; Si(CH$_3$)$_2$CH$_2$), 6.74 (1Si; Si(CH$_3$)$_2$CH$_2$).

Example 11. Synthesis of Alkoxysilyl and Alkane Modified Pentasiloxane $(MeO)_3Si$—$CH_2CH_2$—$SiMe_2$-O-$[D]_3$—$SiMe_2$-$(CH_2)_{11}CH_3$ 1-Dodecene (30.2 g, 0.18 mol) and the reaction product of example 4 $(MeO)_3Si$—$CH_2CH_2$—$SiMe_2$-O-$[D]_3$—$SiMe_2$-H (10.1 g, 0.02 mol) were heated to 90° C. upon the addition of Lamureaux-Pt catalyst solution (10 ppm, as 3.3 wt. % Pt solution in octanol). After the initiation of the reaction, additional $(MeO)_3Si$—$CH_2CH_2$—$SiMe_2$-O-$[D]_3$—$SiMe_2$-H (59.7 g, 0.12 mol) were slowly dropped to the reaction mixture. After completion of the addition, the reaction mixture was heated at 120° C. for 1 hr. A yellow liquid was received as the product and used further without purification. Full conversion was indicated through the absence of a Si-signal in the $^{29}$Si NMR that would correspond to a SiH unit (to be expected at around—7.00 ppm as observable in the pentasiloxane $^{29}$Si-NMR spectrum).

$^{29}$Si-NMR (79 MHz, CDCl$_3$, 25° C.) δ [ppm]=−42.33 (1Si; Si(OMe)$_3$), −23.05 (1Si; Si(CH$_3$)$_2$), −22.52 (1Si; Si(CH$_3$)$_2$), −22.28 (1Si; Si(CH$_3$)$_2$), 6.79 (1Si; Si(CH$_3$)$_2$CH$_2$), 7.26 (1Si; Si(CH$_3$)$_2$CH$_2$).

Example 12. Synthesis of Silyl-Ether Protected Catechol and Glycidylether Modified Pentasiloxane $(((CH_3CH_2)_3SiO)_2$—$C_6H_3$—$(CH_2)_3$—$SiMe_2$-O-$[D]_3$—$SiMe_2$-$(CH_2)_3$—O—$C_3H_5O$ 4-Allyl-1,2-di(triethylsilanyloxy)benzene (4.2 g, 11.13 mmol synthesized according to a literature procedure from Jinhwa Heo et al. J. Am. Chem. Soc. 2012, 134 (49), 20139-20145)) and H—$SiMe_2$-O-$[D]_3$—$SiMe_2$-$(CH_2)_3$—O—$C_3H_5O$ (5.6 g, 11.81 mmol) were admixed at room temperature under a nitrogen atmosphere and stirred for 5 min. The reaction mixture was then heated to 110° C. and the Lamoreaux catalyst (10 ppm, octanol solution containing 3.3 w % Pt) was added. The temperature was increased to 130° C. and the reaction mixture was stirred for 2.5 hrs. The crude product was filtered through a PTFE syringe filter (0.45 μm) and volatile components were removed in vacuo (<1 mbar). The product $((CH_3CH_2)_3SiO)_2$—$C_6H_3$—$(CH_2)_3$—$SiMe_2$-O-$[D]_3$—$SiMe_2$-$(CH_2)_3$—O—$C_3H_5O$ was received in 78.1% yield (7.37 g) as pale yellow liquid.

$^1$H-NMR (400 MHz, CDCl$_3$, 25° C.) δ=0.06 (m, 30H; CH$_3$), 0.56 (m, 4H; CH$_2$), 0.75 (m, 12H; CH$_2$), 0.98 (t, 9H; J(H, H)=7.7 Hz; CH$_3$), 0.99 (t, 9H; J(H, H)=7.7 Hz; CH$_3$), 1.62 (m, 4H; CH$_2$), 2.50 (m, 3H; CH$_2$), 2.70 (dd, 1H; J(H, H)=5.2, 4.1 Hz; CH$_2$), 3.07 (m, 1H; CH), 3.42 (m, 3H; CH$_2$), 3.65 (dd, 1H; J(H, H)=11.5, 3.11 Hz; CH$_2$), 6.65 (m, 3H; PhH).

Example 13. Synthesis of Bromoalkene and Glycidylether Modified Pentasiloxane $Br(CH_2)_{11}$—$SiMe_2O$-$D_3$-$SiMe_2$-$(CH_2)_3$—O—$C_3H_5O$ (—$C_3H_5O$=Glycidyl/Propenoxide)

11-Bromo-1-undecene (10.0 g, 42.88 mmol) and the compound H—$SiMe_2$-O-$[D]_3$—$SiMe_2$-$(CH_2)_3$—O—$C_3H_5O$ (2.5 g, 5.30 mmol) of example 9 were admixed at room temperature (25° C.) and heated to 90° C. under a nitrogen atmosphere. Lamoreaux catalyst (10 ppm of a 3.3% Pt solution in octanol) was added, followed by the slow addition of H—$SiMe_2$-O-$D_3$-$SiMe_2$-$(CH_2)_3$—O—$C_3H_5O$ s (13.04 g, 27.69 mmol) over a period of 30 min. Subsequently, the reaction mixture was heated up to 120° C. and stirred at this temperature for additional 90 min. Excess of 11-bromo-1-undecene was removed by vacuum distillation (150° C., <2 mbar). The remaining residue was filtered using a PTFE syringe filter (0.45 μm). The product $Br(CH_2)_{11}$-$Me_2Si$—O-$D_3$-$SiMe_2$-$(CH_2)_3$—O—$C_3H_5O$ (10.0 g, 45.9% yield calculated with respect to the used pentasiloxane starting material) was received as a pale yellow viscous liquid.

$^1$H-NMR (400 MHz, CDCl$_3$, 25° C.) δ [ppm]=0.03 (br, 6H; CH$_3$), 0.03 (br, 6H; CH$_3$), 0.04 (br, 6H; CH$_3$), 0.05 (br, 6H; CH$_3$), 0.07 (br, 6H; CH$_3$), 0.52 (m, 4H; CH$_2$), 1.26 (m, 14H; CH$_2$), 1.40 (m, 2H; CH$_2$), 1.60 (m, 2H; CH$_2$), 1.83 (m, 2H; CH$_2$), 2.58 (dd, 1H; J(H, H)=5.2, 2.7 Hz; CH$_2$), 2.76 (dd, 1H; J(H, H)=5.2, 4.2 Hz; CH$_2$), 3.12 (m, 1H; CH), 3.37 (t, 2H; J(H, H)=6.9 Hz; CH$_2$), 3.42 (m, 3H; CH$_2$), 3.67 (dd, 1H; J(H, H)=11.7, 3.2 Hz; CH$_2$).

Example 14. Synthesis of Phosphonic Acid Ester and Glycidylether Modified Pentasiloxane $(EtO)_2P(O)$—$(CH_2)_{11}$-$Me_2Si$—$O$-$D_3$-$SiMe_2$-$(CH_2)_3$—$O$—$C_3H_5O$ (—$C_3H_5O$=glycidyl/propenoxide)

The compound of example 13, $Br(CH_2)_{11}$-$Me_2Si$—$O$-$D_3$-$SiMe_2$-$(CH_2)_3$—$O$—$C_3H_5O$ (5.0 g, 7.10 mmol) and triethyl phosphite (2.7 g, 16.33 mmol) were mixed at room temperature (25° C.) and heated to 130° C. under a gentle stream of $N_2$. After 2.5 hrs, the temperature was increased to 150° C. and the conversion was monitored with $^1H$ NMR spectroscopy. Additional triethyl phosphite was added gradually (in each step portion of 1.2 g, 7.10 mmol) to the reaction mixture until full conversion was observed after 11 hrs. The excess of the triethyl phosphite was removed in vacuo (<0.1 mbar). The remaining residue was filtered using a PTFE syringe filter (0.45 m). The product $(EtO)_2P(O)$—$(CH_2)_{11}$-$Me_2Si$—$O$-$D_3$-$SiMe_2$-$(CH_2)_3$—$O$—$C_3H_5O$ (2.9 g, 51.9% yield calculated with respect to the amount of used pentasiloxane starting material) was received as a pale yellow viscous liquid.

$^1$H-NMR (400 MHz, $CDCl_3$, 25° C.) δ [ppm]=0.02 (br, 6H; $CH_3$), 0.03 (br, 6H; $CH_3$), 0.04 (br, 6H; $CH_3$), 0.04 (br, 6H; $CH_3$), 0.06 (br, 6H; $CH_3$), 0.51 (m, 4H; $CH_2$), 1.25 (m, 16H; $CH_2$), 1.30 (t, 6H; J(H, H)=7.1 Hz; $CH_3$), 1.58 (m, 4H; $CH_2$), 1.69 (m, 2H; $CH_2$), 2.58 (dd, 1H; J(H, H)=5.2, 2.7 Hz; $CH_2$), 2.77 (dd, 1H; J(H, H)=5.2, 4.1 Hz; $CH_2$), 3.12 (m, 1H; CH), 3.42 (m, 3H; $CH_2$), 3.67 (dd, 1H; J(H, H)=11.5, 3.2 Hz; $CH_2$), 4.07 (m, 4H; $CH_2$).

$^{31}$P-NMR (162 MHz, $CDCl_3$, 25° C.) δ [ppm]=31.7 (s, 1P).

Examples 15 and 16—Antifouling Compositions

The materials of selected examples 6 and 7 were used in fouling release/easy-to-clean coating formulations. Thus, both materials 6 and 7 were mixed in a 50/50 (wt/wt) ratio (Example 15) as well as in a second example in a 90/10 (wt/wt) ratio (Example 16). Upon the addition of 3.0 wt. % of a diisopropoxy-bis(ethylacetoacetato)titanate ($Ti(acac)_2OiPr_2$) as moisture cure-facilitator to each of the mixtures, both formulations were individually applied using a coating knife in a thickness of approx. 300 μm on PVC panels (PVC Simona-CAW, size 100×100×2 mm) prior primed with a commercial primer (2-pack epoxy primer, Hempel Light Primer, 11630—off white, primer layer thickness approx. 50 μm).

The prepared test panels A (from the 50/50 (wt/wt) mixture and 3 wt. % of $Ti(acac)_2OiPr_2$) and B (from the 90/10 (wt/wt) mixture and 3 wt. % of $Ti(acac)_2OiPr_2$) were allowed to cure at ambient conditions (25° C., approx. 50% humidity) for 24 hrs.

Static sea water immersion tests in the North Sea area were performed in the harbor of Norderney, Lower Saxony, Germany by the Laboratory for Freshwater, Marine Research LimnoMar. The fouling release performance of the prepared test panels A and B was tested against control samples. An uncoated PVC panel (C) and a PVC panel coated with Hempel Light Primer (D) served as negative control reference samples. As positive references, a PVC panel coated with a commercial Cu-containing biocide antifouling paint (E) and a PVC panel coated with a commercial Zn-containing (controlled depletion polymer system) antifouling paint formulation (F) were included in the study. All sample panels were positioned into a metal rack (side-by-side) which was subsequently submersed in the North Sea (from mid January to the end of August).

All test panels remained continuously in the sea water and were removed only temporarily in order to assess the coated surfaces with respect to their achieved antifouling/fouling release performances. The fouling release evaluation was conducted according to the international ASTM standards (Standard test method for the evaluation of marine biofouling on coated test panels). Before the actual assessment, all panels were rinsed with sea water in order to remove loose adhering material from the surface. For the evaluation a fouling release rating (FR) from 100 to 0 was utilized, where a rating score of 100 refers to a surface free of fouling, while a rating of 0 was assigned to a surface entirely covered with marine biofouling.

It became evident that especially the panel A showed a similar performance (FR=73) up to 189 days to the commercial Zn-releasing reference coating on panel F (FR=80). The commercial Cu-containing biocidal reference on panel E exhibited to greatest extent no fouling coverage. In strong contrast, the untreated PVC plate (panel C) as well as the panel D coated with the primer formulation showed a significant overgrowth with fouling (FR=0 and FR=2, respectively). It was observed that the accumulated fouling coverage on the panels A and B can be easily removed by wiping gently over the surface using a soft sponge. This demonstrates the low adhesion force between the fouling on the surface and the top coat underneath. Although the fouling coverage on panel A revealed to be increased after 189 days (FR=0; 219 days), the self-recovery of the panel B after 219 days demonstrates the low adherence of the fouling and thus the fouling release effect.

The performance of the coating formulations were also confirmed through dynamic sea immersion experiments using the RotoMarin® test setup located at LimnoMar's Norderney test site. For instance, an area coated with the same composition used for preparation of panel A showed that the biofouling growth could be efficiently prevented at surface flow velocities of >12 knots (FR=98, after 83 days of sea immersion). This result strongly indicates the anticipated fouling release effect from the top coat based on blend from the materials examples 6 and 7.

Examples 17-19—Antifogging Coating Composition

The production of the varnish was done following the procedure described for Example 1 in EP1087001 except that the kind and amount of material was changed. Instead of using pure methyltrimethoxysilane (B1), mixtures of the latter one with the pentasiloxane described in example 6 (A1) and the polyhydroxy-alkoxysilane (C1) described below were used.

Synthesis of Polyhydroxy-Alkoxysilane (C1)

In a 500 ml three-necked flask, equipped with refluxing condenser, thermometer and mechanical stirrer, 63.80 g (0.27 mol epoxy groups) of an epoxy silane of the structure $(CH_3O)_3Si$—$(CH_2)_3$—$O$—$C_3H_5O$ (—$C_3H_5O$=glycidyl/propenoxide) 36.20 g (0.27 mol COOH) of an acid of the structure $CH_3C(CH_2OH)_2COOH$, 1 g triethylamine and 233.3 g propylene glycol monomethyl ether are mixed under $N_2$ at room temperature. The mixture is heated to 80° C. for 64 hours. Afterwards, the epoxide conversion is analyzed by means of NMR $^1$H (95%). The solution containing a polyhydroxysilane of the structure

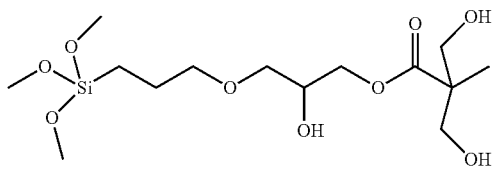 [SMILES: CO[Si](CCCOCC(O)COC(=O)C(C)(CO)CO)(OC)OC]

is used as received.
The weight parts ratios and results are shown in Table 2.

Comments on Table 2 Results

Siloxane based coatings for polycarbonate, which show good adhesion to the underlying substrate without the need of a primer system or any other pre-treatment are known in the literature as described above. In the present invention it was found that a combination of alkoxy silanes as base matrix of the coating material with reactive hydrophilic components a superior anti-fogging property of the coating layer can be achieved. By combining the base monomer B1) with A1) an unsymmetrical pentasiloxane, bearing a reactive alkoxysilane group on the one and a polyethylene-oxide

TABLE 2

| | | | Comparative example 1 | Comparative example 2 | Comparative example 3 | 17 | Comparative example 4 | 18 | 19 | Comparative example 5 |
|---|---|---|---|---|---|---|---|---|---|---|
| Monomers | A) | Pentasiloxane (A1) from Example 6 | 7 | 18 | 16 | 13 | 5 | 11 | 9 | 13 |
| | B) | Alkoxysilane (B1) | 22 | — | 5 | 10 | 10 | 10 | 13 | 13 |
| | C) | Polyhydroxyalk-oxysilane (C1) as described above | 7 | 18 | 16 | 13 | 11 | 5 | 4 | — |
| Colloidal Silica | | Ludox AS40 | 7 | 6 | 6 | 6 | 4 | 4 | 4 | 4 |
| Polymer | | Joncryl 581 | 0.6 | 0.6 | 0.6 | 0.6 | 0.6 | 0.6 | 0.6 | 0.6 |
| Catalyst | | Ammonium Salt | 0.08 | 0.08 | 0.08 | 0.08 | 0.08 | 0.08 | 0.08 | 0.08 |
| Solvent | Water | | 19 | 53 | 53 | 53 | 36 | 36 | 36 | 36 |
| | Acetic acid | | 2 | 2 | 2 | 2 | 2 | 2 | 2 | 2 |
| | Isopropanol | | — | 35 | 35 | 35 | 40 | 40 | 40 | 40 |
| | Methoxy propanol | | 10 | 45 | 45 | 45 | 32 | 32 | 32 | 32 |
| Evaluation | Coating appearance | | ◈ | ◇ | ◇ | ◈ | ◈ | ◈ | ◈ | ◈ |
| | Steam Fogging test | | ◇ | — | — | ◈ | ◇ | ◈ | ◈ | ◇ |
| | Breath Test | | ◇ | — | — | ◈ | ◇ | ◈ | ◈ | ◇ |
| | Adhesion Test | | ◈ | — | — | ◈ | ◇ | ◈ | ◈ | ◈ |

◈: good performance;
◇: Borderline property;
◇ Failure

Exemplary Embodiments

Polycarbonate panels (Makrolon AL2647, 3.2 mm thickness) were flow coated with the antifogging coating compositions mentioned in Table 2. After a flash-off at ambient conditions for 2 min, the coated article was heat cured in an air circulated convection oven at 120-130° C. for 30 min. The resulting coating layer thickness was in the range of 1-6 rm. The obtained coating-polycarbonate composites were evaluated for anti-fogging performance, adhesion and optical appearance.

Steam Fogging Test:

A transparent polycarbonate panel coated with the Antifog coating was placed 5 cm above a water surface of a warm water bath which is maintained at 60° C. The coating layer is exposed for 30 s or 60 s to the constant steam of the water bath. No visible fogging should occur during this time frame, nor any other visible defect on the coating surface.

Breath Test:

At ambient temperature a transparent polycarbonate panel coated with the Antifog coating is hold in 10 cm distance and breath is blown on the panel for about 2 s. The absence of fogging was observed by visual observation.

Adhesion Test:

The adhesion property of the coating to polycarbonate substrates (e.g. Makrolon, Lexan) is tested by cross hatch tested according to EN ISO 2409 using a Tesa® 4657 tape.

chain on the other end in addition to C1) a reactive polyhydroxy-alkoxysilane a hydrophilic coating material is formed in a sol-gel process which is suitable for automotive applications. A combination of the base matrix components of 50% alkoxy silane B1) with 35% of pentasiloxane A1) and 15% of polyhydroxy-alkoxysilane C1) was found to show the optimal performance. If the concentration of A1) and C1) increases over 70%, the ability to form a proper coating layer is lost. On the other hand, if the concentration of B1) is close to 60% or higher, an anti-fogging property is no longer observed.

Embodiments of the invention have been described above and modifications and alterations may occur to others upon the reading and understanding of this specification. The claims as follows are intended to include all modifications and alterations in so far as they come within the scope of the claims or the equivalent thereof.

What is claimed is:

1. A polyorganosiloxane comprising two different terminal groups $Z^1$ and $Z^2$ of the formula (I)

p is 4 or 9, and 80% or more of the polyorganosiloxane of the formula (I) has the same chain length, m=1 to 5 wherein R=R¹

R or R¹ is a saturated hydrocarbon substituent selected from the group consisting of a monovalent C1 to C22-alkyl, optionally substituted by F, a C6-C22-aryl, a C8-C22-polycyclic aryl, a C7-C23-alkylaryl, and a C7-C22-arylalkyl group, L is a single bond, or a divalent L¹ or L² selected from the group consisting of a divalent C1-C12-alkylene group, which can be interrupted by one or more —O—, or —NR³—C(O)—, and/or —NR³—OC(O)NR³—, —N—R³HC(O)N—R³—, and substituted by one or more OH groups, wherein R³ is hydrogen, Me₃Si— or C1-C8-alkyl, bonded via a carbon bond to an adjacent silicon atom of the polyorganosiloxane, Z¹ is (R¹X)ₓR¹₃₋ₓSi—, where X is O, x is 1-3, and R¹ is a saturated hydrocarbon substituent selected from the group consisting of a monovalent C1 to C22-alkyl, optionally substituted by F, a C6-C22-aryl, a C8-C22-polycyclic aryl, a C7-C23-alkylaryl, and a C7-C22-arylalkyl group; and Z² is selected from the group consisting of R¹, R², hydrogen, monovalent unsubstituted or substituted C1-C30 hydrocarbons, and an ionic group comprising one or more O, N, S and P atoms, wherein R² is selected from a monovalent unsaturated, unsubstituted or substituted alkenyl or alkynyl group selected from the group consisting of a C2-C22-alkenyl, C6-C22-cycloalkenyl, C7-C22-bicycloalkenylalkylene, C2-C22-alkynyl, and an oxiranyl or carbonate derivative thereof, selected from C3-C22-oxiranyl groups and C4-C23-carbonate compounds, and a group selected from Cl, Br, I, —SH, —S—R¹, —OH, —O—R¹, —CN, —NCO, blocked NCO, and a group selected from (R¹X)ₓR¹₃₋ₓSi—, R⁶ₓR¹₃₋ₓSi—, wherein x is 1-3, wherein X is selected from —O—, —NR¹—, and —C(O)—O— wherein R⁶ is selected from C6-C10-aryl, C7-C12-arylalkyl, C6-C12-cycloalkyl, C7-C16-bicycloalkyl, C3-C12-epoxy alkyl, C6-C12-epoxy cycloalkyl, C7-C16-epoxy bicycloalkyl, C6-C12-thiocycloalkyl, C5-C12-hetero, —N-aryl, —O-aryl, —S-aryl, and selected from an ionic group derived from an ester of a carboxylic acid, sulfur or phosphorous based acid selected from —C(O)—O—R³, (R³O)₂—P(O)—O—, (R³O)₂—P(O)—, (R³—O)₂—P—, betaines, —NHR³—CH₂—COOH, —NHR³—CH₂—O—S(O)₂(OH), —S—S(O)₂(OR³), —NR³₂, —PR³₂, and an acid addition salt of an amine, or phosphine, and alkyl or aryl enamine of the formula

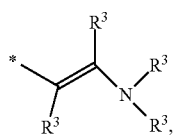

wherein R³ is selected from the group consisting of hydrogen, C1-C8 alkyl, C2-C8 alkenyl, and R¹₃Si—, all Z groups are bonded via a single bond or carbon bond of L to the silicon atom of the polyorganosiloxane (I), whereby -L-Z² and -L-Z¹ are different.

2. The polyorganosiloxane according to claim 1, wherein R and R¹ are each selected from the group consisting of methyl, 3,3,3-trifluoropropyl, phenyl, styryl, phenylpropyl, and naphthyl, Z² is selected from the group consisting of vinyl, allyl, hexenyl, octenyl, allyloxypropyl, —CH₂C≡CH, —C(O)C≡CH, —C(O)(CH₂)₈CH=CH₂, cyclohexenylethyl, limonyl, norbornenylethyl, vinylphenylethyl, allyloxyphenyloxypropyl, —(OCH₂CH₂O)ₐ—(OCH₂CH(CH₃))ᵦ—(OCH₂CH₂CH(CH₃))c—OCH=CH₂, —(OCH₂CH₂—)ₐ—(OCH₂CH(CH₃))ᵦ—(OCH₂CH₂CH(CH₃))c—OH, —(OCH₂CH₂)ₐ—(OCH₂CH(CH₃))ᵦ—(OCH₂CH₂CH(CH₃))c—O—C1-C4 alkyl, —(OCH₂CH₂)ₐ—(OCH₂CH(CH₃))ᵦ—(OCH₂CH₂CH(CH₃))c—O—C(O)—C1-C4 alkyl, with a, b, c being independently selected from 0 to 20, and a+b+c=1 to 20, —[—Si(CH₃)₂OSi(CH₃)₂]CH=CH₂, and

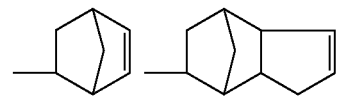

and (R¹X)ₓR¹₃₋ₓSi—, wherein x=1-3, wherein X is selected from —O—, —NR¹—, and —C(O)—O—, and of unsubstituted or substituted oxyphenyl moieties of the formula

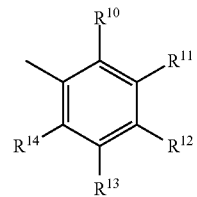

wherein R¹⁰, R¹⁴ is hydrogen or R¹ and R¹¹, R¹², R¹³ are selected from —OR³, eugenol, bisphenolethers, cumylphenolether, glycidylpropylether, epoxylimonyl, epoxycyclohexanethyl, epoxynorbornyl,

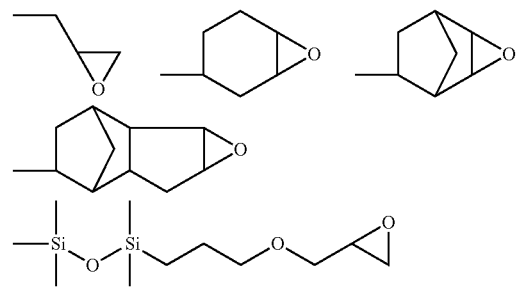

and the carbonate derivatives of these epoxides, 1,3-dithiolane, 1,3,5-trithiane, 1,3-dithiane, thiophenyl, tetrahydro-2H-thiopyranyl, carbazole, indole, trisphenylsilyl, and R⁶Me₂Si—, wherein R⁶ is selected from a C6-C10-aryl, C7-C12-arylalkyl, C6-C12-cycloalkyl, C7-C16-bicycloalkyl, C6-C12-cyclothioalkyl, C5-C12-hetero, —N-aryl, —O-aryl, —S-aryl, optionally substituted by C1-C8-alkyl, OH, Cl, CN and a silyl ether group R¹₃Si—O—, and a group selected from Cl, —S—H, —NCO, blocked NCO, and selected from an ionic group derived from an ester of a carboxylic acid, —C(O)—O—R³, (R³O)₂—P(O)—O—, (R³O)₂—P(O)—, (R³—O)₂—P—, —NHR³—CH₂—COOH, —NHR³—CH₂—O—S(O)₂(OH), —S—S(O)₂(OR³), —NR³₂ or —PR³₂, and an acid addition salt of an amine or phosphine and salts having quaternary —N⁺R¹₃ or —P⁺R¹₃ groups, whereby at least two of the groups R¹¹, R¹², and R¹³ are OH groups.

3. The polyorganosiloxane according to claim 1, wherein R¹ is selected from the group consisting of methyl, phenyl, and 3,3,3-trifluoropropyl, Z² is selected from phenyl, phenylpropyl, styryl, naphthyl, eugenol, bisphenolethers, cumylphenolether, and of unsubstituted or substituted oxyphenyl moieties of the formula

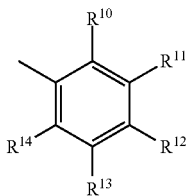

wherein R¹⁰, R¹⁴ is hydrogen or R¹ and
R¹¹, R¹², R¹³ are selected from —OR³,
and norbornyl, vinyl, allyl, allyloxypropyl, hexenyl, norbornenyl, cyclohexenylethyl, limonyl, and glycidylpropylether, epoxylimonyl, epoxycyclohexanethyl, epoxynorbornyl, and the carbonate derivatives of these epoxides, and a group selected from Cl, —S—H, —NCO, blocked NCO, and a group selected from (R¹X)ₓR¹₃₋ₓSi—, R⁶ₓR¹₃₋ₓSi—, wherein x is 1-3, wherein X is —O—, —NR¹, wherein R⁶ is selected from the group consisting of phenyl, naphthyl, phenylethyl, phenylpropyl, eugenol, limonyl, epoxylimonyl, glycidylpropylether epoxycyclohexylethyl, norbornenylethyl, epoxy norbornenylethyl, carbazole, indole, and selected from an ionic group derived from an ester of a carboxylic acid, —C(O)—O—R³, (R³O)₂—P(O)—O—, (R³O)₂—P(O)—, (R³—O)₂—P—, —NHR³—CH₂—COOH, —NHR³—CH₂—O—S(O)₂(OH), and —NR³₂, an acid addition salt of an amine, salts having quaternary —N⁺R¹₃, and enamines, bonded via a single bond or carbon bond of L to the silicon atom of the siloxy unit, whereby at least one of the groups R¹¹, R¹², and R¹³ are OH groups.

4. The polyorganosiloxane according to claim 1, wherein Z² is selected from the group consisting of phenyl, phenylpropyl, styryl, naphthyl, eugenol, bisphenolethers, cumylphenolether, norbornyl, vinyl, allyl, allyloxypropyl, hexenyl, octenyl norbornenyl, cyclohexenylethyl, limonyl, glycidylpropylether, epoxylimonyl, epoxycyclohexanethyl, epoxynorbornyl, and the carbonate derivatives of these epoxides and C4-C23-carbonate groups thereof, and —C(O)—O—R³, (R³O)₂—P(O)—O—, (R³O)₂—P(O)—, (R³—O)₂—P—, wherein R³ in —C(O)—O—R³, (R³O)₂—P(O)—O—, (R³O)₂—P(O)—, (R³—O)₂—P— is selected from R', and a group selected from Cl, —SH, —NCO, blocked NCO, triphenylsilyl, and R⁶R¹₂Si—, wherein R⁶ is selected from the group consisting of phenyl, naphthyl, phenylethyl, phenylpropyl, eugenol, limonyl, epoxylimonyl, glycidylpropylether epoxycyclohexylethyl, norbornenylethyl, epoxy norbornenylethyl, carb azole, and indole.

5. The polyorganosiloxane according to claim 1, wherein the polyorganosiloxane is of the formula (Ia):

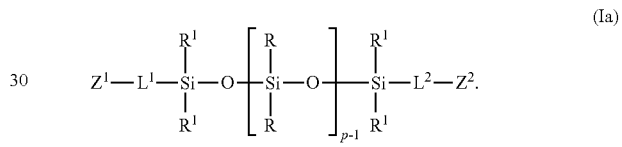

(Ia)

6. The polyorganosiloxane of claim 5, wherein the polyorganosiloxane is selected from compounds of the group which have the formulas (IIa) to (IIe):

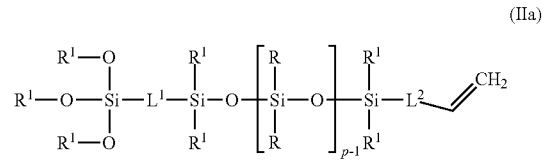

(IIa)

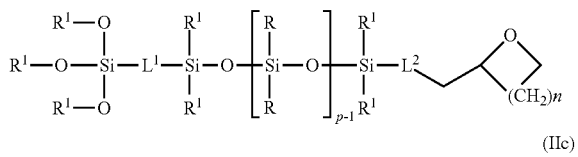

(IIb)

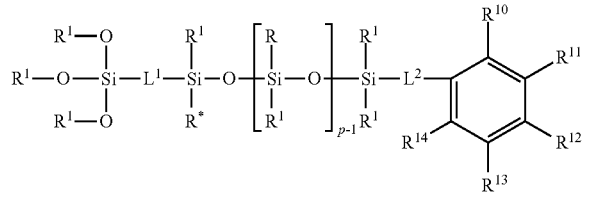

(IIc)

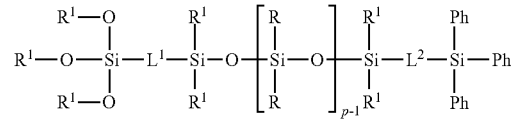

(IId)

(IIe)

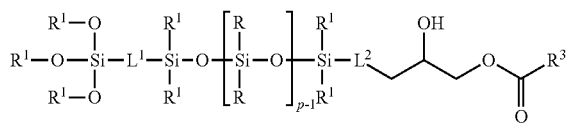

R and R¹ in (IIa) to (IIe) are selected from the group consisting of methyl, 3,3,3-fluoropropyl, and phenyl, and can be the same or different;
p=4 or 9;
n=0-6;
$R^{10} R^{11}$ is hydrogen or $R^1$;
$R^{11}$, $R^{12}$, $R^{13}$ are selected from —$OR^3$,
and
norbornyl, vinyl, allyl, allyloxypropyl, hexenyl, norbornenyl, cyclohexenylethyl, limonyl, and glycidylpropylether, epoxylimonyl, epoxycyclohexanethyl, epoxynorbornyl, and the carbonate derivatives of these epoxides,
and a group selected from Cl, —S—H, —NCO, blocked NCO, and a group selected from $(R^1X)_xR^1_{3-x}Si$—, $R^6_xR^1_{3-x}Si$—, wherein x=1-3, wherein
X is O—$NR^1_2$—, wherein
$R^6$ is selected from the group consisting of phenyl, naphthyl, phenylethyl, phenylpropyl, eugenol, limonyl, epoxylimonyl, glycidylpropylether epoxycyclohexylethyl, norbornenylethyl, epoxy norbornenylethyl, carbazole, indole,
and selected from an ionic group derived from an ester of a carboxylic acid,
—C(O)—O—$R^3$, $(R^3O)_2$—P(O)—O—, $(R^3O)_2$—P(O)—, $(R^3$—$O)_2$—P—, —$NHR^3$—$CH_2$—COOH, —$NHR^3$—$CH_2$—O—$S(O)_2$(OH),
—$NR^3_2$, an acid addition salt of an amine, a salt having a quaternary —$N^+R^1_3$, and an enamine,
bonded via a single bond or carbon bond of L to the silicon atom of the siloxy unit;
$(R^1X)_xR^1_{3-x}Si$—, $R^6_xR^1_{3-x}Si$— is a saturated hydrocarbon substituent selected from the group consisting of a monovalent C1 to C22-alkyl, optionally substituted by F, a C6-C22-aryl, a C8-C22-polycyclic aryl, a C7-C23-alkylaryl, and a C7-C22-arylalkyl group, $R^3$ is hydrogen, C1-C8 alkyl, C2-C8 alkenyl, $R^1_3Si$—, and whereby at least two of the groups $R^{11}$, $R^{12}$, and $R^{13}$ are OH groups;
$L^1$ and $L^2$ are selected from the group of C1-C14-alkyl, C1-C14-alkylether groups and can be different to each other.

7. A process for forming a polyorganosiloxane according to claim 5 comprising:
(i) reacting a first compound $L^*$-$Z^1$ with a symmetrically α,ω-terminated polyorganosiloxane of the formula $Z^*$-L-$SiR^1_2$—O[—$SiR_2O$-]$_{p-1}$-$SiR^1_2$-L-$Z^*$
p=4 or 9
$Z^*$=hydrogen hydrogen, and L is a bond,
optionally in the presence of a catalyst, $L^*$ is an unsaturated C2-C20-alkenyl whereby $L^*$ and $Z^*$ form the unit -$L^1$-$Z^1$ in the reaction of $L^*$-$Z^1$ with $Z^*$-L-$SiR^1_2$—O[—$SiR_2O$-]$_{p-1}$-$SiR^1_2$-L-$Z^*$,
(ii) separating the product of step (i) after one group $Z^*$ has been reacted to form a mono functional product -$L^1$-$Z^1$, and
(iii) submitting the mono functionalized product of step (ii) to a further reaction with a compound of the formula $L^{**}$-$Z^2$ to form a group -$L^2$-$Z^2$, whereby
$L^{**}$ is an unsaturated C2-C20-alkenyl.

8. The process of claim 7, wherein (i)-(iii) comprises:
(i) reacting an alkoxysilane of the formula $(R^1O)_xR^1_{3-x}Si$—H with a dialkenyl compound of the formula:

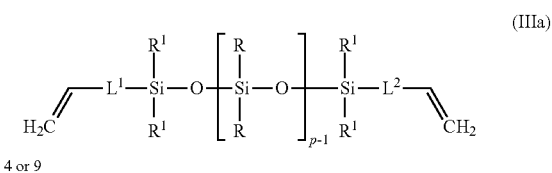

(IIIa)

p_ = 4 or 9 in the presence of a hydrosilylation catalyst,
(ii) separating the product from (i) wherein one alkenyl group -$L^{**}$-$Z^1$ has been reacted to form -$L^1$-$Z^1$, and
(iii) submitting the product with the one alkenyl group of step (ii) to a further hydrosilylation reaction with a silane or siloxane compound having one SiH group of the formula $L^{**}$-$Z^2$ to form a group -$L^2$-$Z^2$.

9. The process of claim 7, wherein (i)-(v) comprises
(i) reacting an alkoxysilane of the formula $(R^1O)_xR^1_{3-x}Si$-L-CH=$CH_2$ with a hydrogen siloxane of the formula:

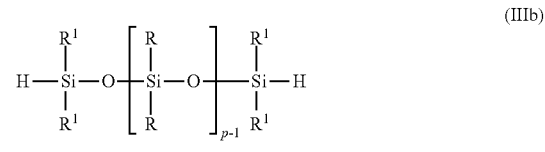

(IIIb)

p_ = 4 or 9 in the presence of a hydrosilylation catalyst,
(ii) separating the product wherein one SiH group has been reacted to form -$L^1$-$Z^1$,
(iii) submitting the mono SiH group functional product of step (ii) to a further hydrosilylation reaction with an unsaturated compound of the formula $L^{**}$-$Z^2$ to form a group -$L^2$-$Z^2$.

10. A composition comprising at least one polyorganosiloxane of claim 1.

11. The composition of claim 10, wherein the composition is a cured composition for the use in a coating composition, a rubber composition, and in an optical device.

12. The composition of claim 10, wherein the composition is an antifouling composition.

13. The antifouling composition of claim 12, wherein the composition comprises a polyorganosiloxane of the formula (I)
wherein
R is $R^1$, which is selected from a saturated hydrocarbon substituent selected from the group consisting of a monovalent C1 to C22-alkyl and a C6-C22-aryl,
$Z^2$ is selected from the group consisting of
a) unsubstituted or substituted, linear, branched or cyclic, saturated or unsaturated C1-C30 hydrocarbons selected from the group consisting of C3-C22 linear alkyl, C3-C22 branched alkyl, C8-C22-alkylarylalkyl, C6-C22-aryl ether, C6-C22-cycloalkyl, C7-C22-cycloalkylalkylene, C7-C22-bicycloalkyl, or a combination thereof, and b) a poly-C2-C4-alkylene oxide that is OH or OR$^3$ or OC(O)R$^3$ terminated, and wherein
R$^3$ in OR$^3$ or OC(O)R$^3$ is selected from C1-C8 alkyl.

14. The antifouling composition according to claim 13 comprising a mixture of polyorganosiloxanes of formula (I), the mixture comprising (i) a polyorganosiloxane where Z$^2$ is chosen from a), and (ii) a polyorganosiloxane where Z$^2$ is chosen from b).

15. The antifouling composition of claim 14, wherein the wt % ratio between the polyorganosiloxane (i) and the polyorganosiloxane (ii) is 10:90 to 90:10.

16. The antifouling composition of claim 12, wherein the composition comprises a polyorganosiloxane of the formula (I)
p=4,
m=1 to 2
wherein
R is R$^1$ which is selected from a saturated hydrocarbon substituent selected from the group consisting of a monovalent C1 to C3-alkyl and a C6 aryl,
L is selected from
—CH$_2$CH$_2$—,
—CH$_2$CH$_2$O—, CH$_2$CH$_2$CH$_2$O—, —CH(CH$_3$)CH$_2$O—, —CH$_2$CH$_2$CH(CH$_3$)CH$_2$O—, —CH=CH—CH$_2$O—,
—CH$_2$CH$_2$OC(O)—, CH$_2$CH$_2$CH$_2$OC(O)—, —CH$_2$CH$_2$CH(CH$_3$)CH$_2$OC(O)—, —CH=CH—CH$_2$OC(O)—,
Z$^2$ is selected from the group consisting of
a) unsubstituted or substituted, linear, branched or cyclic, saturated or unsaturated C1-C22 hydrocarbons; and
b) a poly-C2-C4-alkylene oxide of the structures
—(OCH$_2$CH$_2$—)$_a$—(OCH$_2$CH(CH$_3$))$_b$—(OCH$_2$CH2CH(CH$_3$))$_c$—OH
—(OCH$_2$CH$_2$)$_a$—(OCH$_2$CH(CH$_3$))$_b$—(OCH$_2$CH$_2$CH(CH$_3$))$_c$—O—(C1-C4 alkyl); or
—(OCH$_2$CH$_2$)$_a$—(OCH$_2$CH(CH$_3$))$_b$—(OCH$_2$CH$_2$CH(CH$_3$))$_c$—O—C(O)—(C1-C4 alkyl)
with a, b, c being independently selected from 0 to 20, and a+b+c=1 to 20.

17. The antifouling composition of claim 12, wherein the composition comprises a polyorganosiloxane of the formula (I)
p=4,
m=1,
wherein
R and R$^1$ are a monovalent C1 to C3-alkyl,
L is a divalent group L$^1$ or L$^2$ selected from the group consisting of a divalent C1-C4-alkylene group, optionally interrupted by one or more —O—, —C(O)— moieties, and/or substituted by one or more OH groups,
Z$^2$ is selected from the group consisting of
unsubstituted branched saturated C1-C22 hydrocarbons.

18. The antifouling composition of claim 12, wherein
p=4,
m=1,
wherein
R is R$^1$ which is selected from a saturated hydrocarbon substituent selected from the group consisting of a monovalent C1 to C3-alkyl,
L is a divalent group L$^1$ or L$^2$ selected from the group consisting of a divalent C1-C4-alkylene group, which can be interrupted by one or more —O—, —C(O)— moieties, and substituted by one or more OH groups, specifically
—CH$_2$CH$_2$—,
—CH$_2$CH$_2$O—, CH$_2$CH$_2$CH$_2$O—, —CH$_2$CH$_2$CH(CH$_3$)CH$_2$O—,
Z$^2$ is are selected from the group consisting of
a poly-C2-C4-alkylene oxide of the structures
—(OCH$_2$CH$_2$—)$_a$—(OCH$_2$CH(CH$_3$))$_b$—(OCH$_2$CH$_2$CH(CH$_3$))$_c$—OH
—(OCH$_2$CH$_2$)$_a$—(OCH$_2$CH(CH$_3$))$_b$—(OCH$_2$CH$_2$CH(CH$_3$))$_c$—O—(C1-C4 alkyl); or
—(OCH$_2$CH$_2$)$_a$—(OCH$_2$CH(CH$_3$))$_b$—(OCH$_2$CH$_2$CH(CH$_3$))$_c$—O—C(O)—(C1-C4 alkyl)
with a, b, c being independently selected from 0 to 20, and a+b+c=1 to 20.

19. The composition of claim 12, wherein the composition is an antifog composition comprising a polyorganosiloxane of the formula (I),
P=9,
m=1 to 5
wherein
R=R$^1$ and is a saturated hydrocarbon substituent selected from the group consisting of a monovalent C1 to C22-alkyl, a C6-C22-aryl,
L is a single bond or a divalent group L$^1$ or L$^2$ selected from the group consisting of a divalent C1-C12-alkylene group or divalent or trivalent C1-C12 alkylidene group optionally interrupted by one or more —O—, —C(O)—, —NR$^3$—C(O)—, —NR$^3$—, —OC(O)NR$^3$—, —N—R$^3$HC(O)N—R$^3$— moieties, and/or substituted by one or more OH groups, wherein R$^3$ is hydrogen, Me$_3$Si— or C1-C8 alkyl, bonded via carbon bond to the silicon atom of the siloxy unit
Z$^2$ is selected from the group which consists of
a poly-C2-C4-alkylene oxide that is OH or OR$^3$ or OC(O)R$^3$ terminated, and wherein
R$^3$ is selected from C1-C8 alkyl, and
a group selected from
(R$^1$X)$_x$R$^1{}_{3-x}$Si—, wherein x=1-3, wherein
X is selected from —O— and —C(O)—O.

20. The composition of claim 19 comprising:
A) the polyorganosiloxane of the formula (I) where
p=4,
m=1,
wherein
R is R$^1$ and is selected from a saturated hydrocarbon substituent selected from the group which consists of a monovalent C1 to C3-alkyl,
L is a divalent group L$^1$ or L$^2$ which are selected from the group consisting of a divalent C1-C4-alkylene group, optionally interrupted by one or more of —O—, —C(O)— moieties, and/or substituted by one or more OH groups, specifically
Z$^2$ is selected from the group consisting of
a poly-C2-C4-alkylene oxide of the structures
—(OCH$_2$CH$_2$—)$_a$—(OCH$_2$CH(CH$_3$))$_b$—(OCH$_2$CH$_2$CH(CH$_3$))$_c$—OH
—(OCH$_2$CH$_2$)$_a$—(OCH$_2$CH(CH$_3$))$_b$—(OCH$_2$CH$_2$CH(CH$_3$))$_c$—O—(C1-C4 alkyl);
—(OCH$_2$CH$_2$)$_a$—(OCH$_2$CH(CH$_3$))$_b$—(OCH$_2$CH$_2$CH(CH$_3$))$_c$—O—C(O)—(C1-C4 alkyl)
with a, b, c being independently selected from 0 to 20, and a+b+c=1 to 20, a group selected from
$(R^1X)_xR^1_{3-x}Si-$, wherein
   X is $-O-$,
B) silanes $(R^1X)_xR^1_{4-x}Si-$, wherein x=1-4, wherein
   X is $-O-$,
C) silanes $(R^1X)_xR^1_{3-x}Si-R^{10}$, wherein x=1-3, wherein
   X is $-O-$, wherein
   $R^{10}$ is selected from the group consisting of a C2-C22-alkyl which can be interrupted by one or more $-O-$, $-C(O)-$ moieties, and is substituted by at least one or more OH groups,
   optionally where $R^{10}$ has the formula -L-$Z^3$, wherein $Z^3$ is a group selected from the group consisting of a C1-C18-alkyl group or C1-C10-alkylidene group which can be interrupted by one or more $-O-$, $-C(O)-$ moieties, and is substituted by one or more OH groups.

21. The composition of claim 20, wherein the group $Z^3$ is derived from hydroxyl functionalized carboxylic acids chosen from:
   C2 to C12 saturated or unsaturated hydroxyalkyl carboxylic acids;
   C2 to C12 saturated or unsaturated polyhydroxyalkyl carboxylic acids;
   or derived from a hydroxylated alcohol selected from ethylene glycol, propylene glycols, butylene glycols, hexylene glycols, glycerol, diglycerol, triglycerol, pentaerythritol, and sorbitol.

22. The composition of claim 20, wherein the wt % ratio of A):B):C) is 10:80:10 to 40:20:40.

23. The composition of claim 12, wherein the composition is an antifog composition comprising a polyorganosiloxane of the formula (I),
   p=4,
   m=1 to 2
   wherein
   R is $R^1$ and is a saturated hydrocarbon substituent selected from the group consisting of a monovalent C1 to C3-alkyl and a C6 aryl,
   L is a divalent group $L^1$ or $L^2$ which are selected from the group consisting of a divalent C1-C8-alkylene group or divalent or trivalent C1-C6-alkylidene group optionally interrupted by one or more $-O-$, $-C(O)-$ moieties, and/or substituted by one or more OH groups,
   $Z^2$ is selected from the group which consists of
   poly-C2-C4-alkylene oxides, OH or $OR^3$ or $OC(O)R^3$ terminated, of the structures
      $-(OCH_2CH_2-)_a-(OCH_2CH(CH_3))_b-(OCH_2CH_2CH(CH_3))_c-OH$
      $-(OCH_2CH_2)_a-(OCH_2CH(CH_3))_b-(OCH_2CH_2CH(CH_3))_c-O-C1-C4\ alkyl$
      $-(OCH_2CH_2)_a-(OCH_2CH(CH_3))_b-(OCH_2CH_2CH(CH_3))_c-O-C(O)-C1-C4\ alkyl$
      with a, b, and c being independently selected from 0 to 20, and
      a+b+c=1 to 20
   a group selected from
   $(R^1X)_xR^1_{3-x}Si-$, wherein x=1-3, wherein
      X is $-O-$, $-C(O)-O-$.

24. The composition of claim 23, wherein the composition is an antifog composition comprising:
   A) the polyorganosiloxane of the formula (I),
   B) silanes $(R^1X)_xR^1_{4-x}Si-$, wherein x=1-4, wherein
      X is selected from $-O-$ and $-OC(O)-$ wherein
   C) silanes $(R^1X)_xR^1_{3-x}Si-R^{10}$, wherein x=1-3, wherein
      X is selected from $-O-$ and $-OC(O)-$ wherein
      $R^{10}$ is a monovalent group which is selected from the group consisting of a C2-C22-alkyl group optionally interrupted by one or more of $-O-$, $-C(O)-$, $-NR^3-C(O)-$, $-NR^3-$, $-OC(O)NR^3-$, or $-N-R^3HC(O)N-R^3-$, and/or substituted by at least one or more OH groups,
      wherein $R^3$ in $-NR^3-C(O)-$, and/or $-NR^3-$, $-OC(O)NR^3-$, $-N-R^3HC(O)N-R^3-$ is hydrogen, $Me_3Si-$, or C1-C8 alkyl.

25. The composition of claim 12, wherein the composition is an antifog composition comprising a polyorganosiloxane of the formula (I),
   p=4,
   m=1,
   wherein
   R is $R^1$ and is selected from a saturated hydrocarbon substituent selected from the group which consists of a monovalent C1 to C3-alkyl,
   L is a divalent group $L^1$ or $L^2$ which are selected from the group consisting of a divalent C1-C4-alkylene group, optionally interrupted by one or more $-O-$, $-C(O)-$ moieties, and/or substituted by one or more OH groups,
   $Z^2$ is selected from the group consisting of of
   a poly-C2-C4-alkylene oxide of the structures
      $-(OCH_2CH_2-)_a-(OCH_2CH(CH_3))_b-(OCH_2CH_2CH(CH_3))_c-OH$
      $-(OCH_2CH_2)_a-(OCH_2CH(CH_3))_b-(OCH_2CH_2CH(CH_3))_c-O-(C1-C4\ alkyl)$; or
      $-(OCH_2CH_2)_a-(OCH_2CH(CH_3))_b-(OCH_2CH_2CH(CH_3))_c-O-C(O)-(C1-C4\ alkyl)$
      with a, b, c being independently selected from 0 to 20, and a+b+c=1 to 20,
   a group selected from
   $(R^1X)_xR^1_{3-x}Si-$, wherein x=1-3, wherein
      X is $-O-$.

26. The composition of claim 25, wherein a is 2 to 20; b is 0 to 10; and c is 0 to 10.

27. A method for (i) dispersing inorganic particles comprising dispersing inorganic particles in the presence of at least one polyorganosiloxane according to claim 1, or (ii) compatibilizing two or more non-miscible liquid phases comprising mixing the two or more non-miscible liquid phases in the presence of at least one polyorganosiloxane according to claim 1.

28. A method for the manufacture of an antifouling agent comprising forming a composition comprising the polyorganosiloxane of claim 1.

29. The composition of claim 1, wherein $Z^2$ is a monovalent substituted or unsubstituted C1-C30 hydrocarbon.

30. The composition of claim 1, wherein $Z^2$ is a C1-C22 alkyl.

31. The composition of claim 1, wherein $R^1$ in $Z^1$ is C1 to C22-alkyl.

* * * * *